United States Patent
Cox, Jr. et al.

(10) Patent No.: US 10,131,558 B1
(45) Date of Patent: Nov. 20, 2018

(54) COMPOSITIONS, METHODS, AND/OR SYSTEMS FOR MANAGING SULFIDE

(71) Applicant: BioSystems Consulting, Inc. DBA Advanced Oxidation Technology, Blacksburg, VA (US)

(72) Inventors: Henry Wilmore Cox, Jr., Blacksburg, VA (US); Jefferson W. Cox, Alexandria, VA (US)

(73) Assignee: BioSystems Consulting, Inc., Blacksburg, VA (US)

( * ) Notice: Subject to any disclaimer, the term of this patent is extended or adjusted under 35 U.S.C. 154(b) by 135 days.

(21) Appl. No.: 15/444,691

(22) Filed: Feb. 28, 2017

Related U.S. Application Data

(60) Provisional application No. 62/301,071, filed on Feb. 29, 2016.

(51) Int. Cl.
| | |
|---|---|
| *C02F 1/68* | (2006.01) |
| *C02F 1/72* | (2006.01) |
| *C02F 3/30* | (2006.01) |
| *C02F 101/10* | (2006.01) |

(52) U.S. Cl.
CPC ............ *C02F 1/725* (2013.01); *C02F 1/683* (2013.01); *C02F 1/722* (2013.01); *C02F 3/301* (2013.01); *C02F 2101/101* (2013.01); *C02F 2305/026* (2013.01)

(58) Field of Classification Search
CPC ...... C02F 1/20; C02F 1/66; C02F 1/72; C02F 1/722; C02F 1/725; C02F 1/727; C02F 1/74; C02F 1/76; C02F 1/78; C02F 3/301; C02F 2101/101; C02F 2305/026
See application file for complete search history.

(56) References Cited

U.S. PATENT DOCUMENTS

| | | | |
|---|---|---|---|
| 4,451,442 A | * 5/1984 | Jeffrey | ............... B01D 53/1425 423/224 |
| 6,960,330 B1 | 11/2005 | Cox | |
| 6,998,099 B2 | 2/2006 | Hesse | |
| 7,745,680 B1 | 6/2010 | Cox | |
| 7,846,408 B1 | 12/2010 | Cox | |
| 7,928,277 B1 | 4/2011 | Cox | |
| 7,968,761 B1 | 6/2011 | Cox | |
| 8,480,924 B1 | 7/2013 | Cox | |
| 8,609,926 B1 | 12/2013 | Cox | |

\* cited by examiner

*Primary Examiner* — Lucas A Stelling
(74) *Attorney, Agent, or Firm* — Michael Haynes PLC; Michael N. Haynes

(57) ABSTRACT

Certain exemplary embodiments can provide a system, machine, device, manufacture, and/or composition of matter configured for, adapted for, and/or resulting from, and/or a method for, activities that can comprise and/or relate to, causing reactions, between sulfides in contaminated water with a ferric chelate and between sulfides in the contaminated water with an oxidizing agent, to form substantially sulfide-free water, the substantially sulfide-free water comprising the ferric chelate and the oxidizing agent.

23 Claims, 8 Drawing Sheets

6000

Determine flow, variation of flow over time, concentration of sulfide, pH, dissolved oxygen content (if any), dimensions of anaerobic environment to include length, width, height, diameter (if pipe), material of construction of anaerobic environment.

Determine placement of injection of pure oxygen, air, or both (pure oxygen and air), placement for ferrochelate injection, or ferrochelate/nitrate mixture injection or both to achieve optimum contact time for achieving successful reduction of sulfide within anaerobic wastewater.

Determine best practicable engineering design for efficient oxygen transfer into receiving wastewater and best practicable engineering design for mixing ferrochelate and ferrochelate/nitrate mixture to achieve efficient mixing into entire flow.

Determine optimum dose rates for pure oxygen, air or both. Determine optimum dose rates for ferrochelates or ferrochelates and nitrate mixture.

FIG. 6

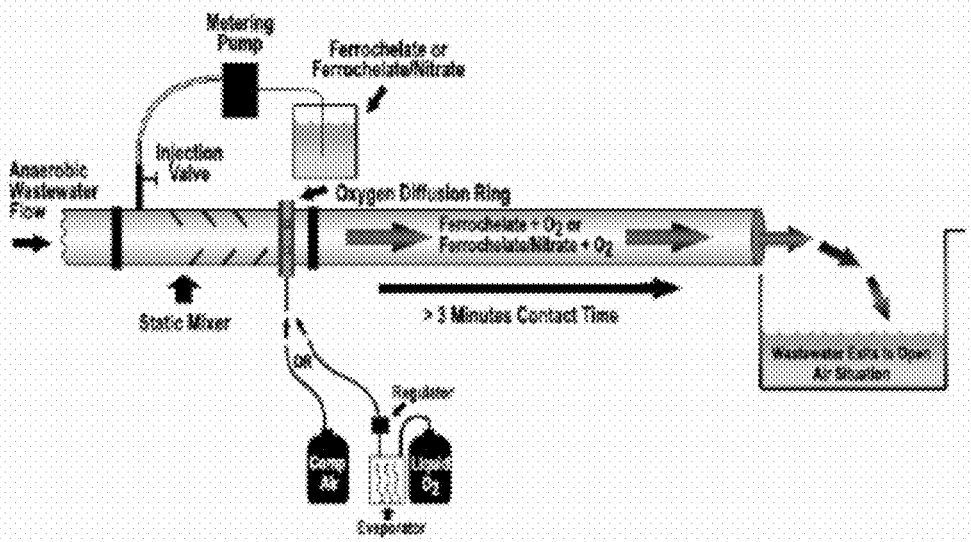
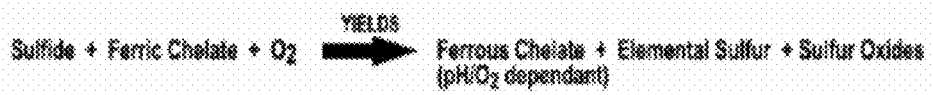
Then Regeneration of Ferric Chelate for Additional Sulfide Oxidation
FIG. 7

8000

COMPOSITIONS, METHODS, AND/OR SYSTEMS FOR MANAGING SULFIDE

CROSS-REFERENCES TO RELATED APPLICATIONS

This application Claims priority to, and incorporates by reference herein in its entirety, U.S. Provisional Patent Application 62/301,071, filed 29 Feb. 2016.

BRIEF DESCRIPTION OF THE DRAWINGS

A wide variety of potential, feasible, and/or useful embodiments will be more Readily understood through the herein-provided, non-limiting, non-exhaustive description of certain exemplary embodiments, with reference to the accompanying exemplary drawings in which:

FIG. 6 is a flowchart of an exemplary embodiment of a method 6000;

FIG. 7 is a block diagram of an exemplary embodiment of a system 7000; and

DESCRIPTION

Part 1: Introduction

Figure 1:
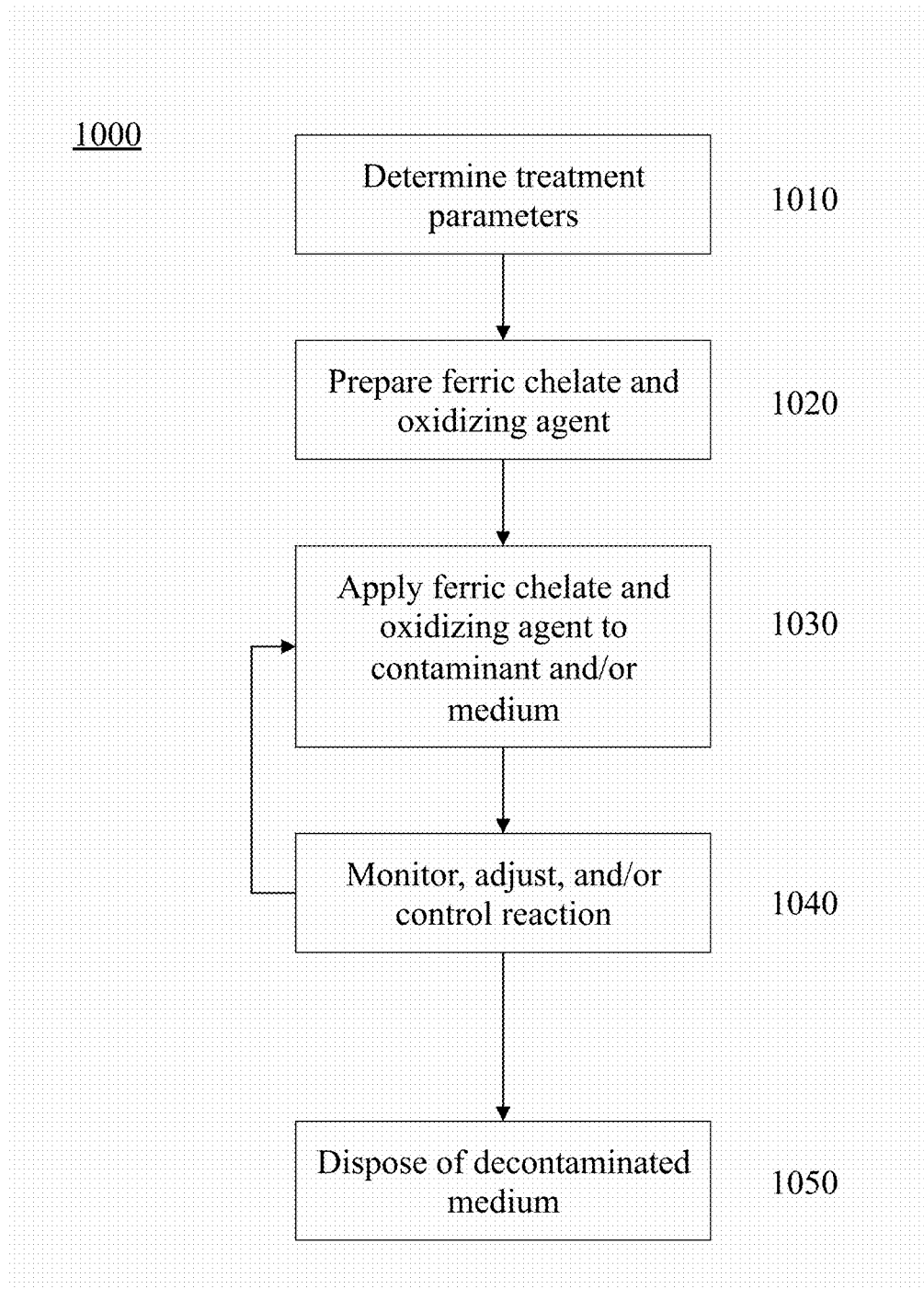
FIG. 1 is a flowchart of an exemplary embodiment of a method 1000.

Sulfide treatment in sewerage and industrial wastewater collection systems can be accomplished using any of a variety of oxidation technologies, which can include hydrogen peroxide, hypochlorite/chlorine, permanganate, ozone, chlorine dioxide, and/or nitrate/nitrite. Yet these techniques can be costly and/or ineffective.

Certain exemplary embodiments provide compositions, methods, and/or systems, some of which can be useful for remediating contamination. Certain exemplary embodiments can be useful for reducing a concentration of a contaminant associated with a medium by treating the medium with ferric gluconate (Fe-GLC) and an oxidizing agent in amounts effective to oxidize at least a portion of the contaminant.

Certain exemplary embodiments can comprise compositions, methods, and/or systems which can be useful for the management and/or treatment of existing sulfide within and/or escaping from industrial and/or municipal wastewater. Certain exemplary methods can rely upon selected ferric/ferrous chelates (sometimes herein referred to as "ferric chelates" or "ferro chelates", such as the ferro aminocarboxylates), potentially including ferro MGDA, ferro EDTA, ferro HEIDA ferro NTA, ferro gluconate and/or other ferro chelants. The reaction of the ferro chelates can oxidize chelates in the ferrous state to the ferric state. It is currently projected that the ferro chelate can react with sulfide to rapidly oxidize sulfide which can create elemental sulfur at a circumneutral pH. In the process, ferric chelate can be reduced to the ferrous chelate state. Oxygen and/or air then can oxidize the resulting ferrous chelate back to the ferric chelate state for an additional reaction with sulfide. This cycle can continue until oxygen is fully depleted. A blend of nitrate and ferro chelate can be an additional exemplary embodiment. The blend of these two chemical agents can serve to extend the life of the treatment for sulfide and/or prevent further generation of sulfide after oxygen is fully consumed.

Certain exemplary embodiments can require that the pH be in a circumneutral range of approximately 6.0 to approximately 8.5. Certain exemplary embodiments can require that pure oxygen and/or compressed air be diffused through an inline gas diffusing/sparging system upstream to allow for a minimum of 3 minutes of contact time to the point at which the wastewater exits the pipe to the atmosphere. Ferric/ferrous chelate can be injected so as to completely mix with the oxygen and/or compressed air. Effective rapid treatment of sulfide can require contact between oxygen and the ferro chelate for a minimum of 3 minutes before wastewater exits the anaerobic environment. Therefore, contact time between oxygen and/or air and the target wastewater can be at least 3 minutes. Data suggests that control of sulfide using such methods can continue for hours. In one exemplary embodiment, data suggests that control of sulfide can be expected for up to 24 hours.

Ferro chelates can be added at a rate of approximately 27 grams to approximately 134.4 grams of ferro chelate (as iron) per part per million of sulfide per million gallons of wastewater. Higher dosages can be used to achieve a more rapid response. Nitrate can be added in a blend with the ferro chelates to extend the life of the process at a rate of application that equates to approximately 3.8 kg to approximately 11.4 kg of nitrate (as NO3) per part per million sulfide per million gallons of wastewater.

Certain exemplary embodiments can comprise compositions, methods, and/or systems that can be useful for the treatment of existing total sulfide within anaerobic wastewater and/or to prohibit further formation of sulfide after removal. Certain exemplary processes can utilize selected ferric chelates (such as the ferro aminocarboxylates), potentially including ferric/ferrous MGDA, ferric/ferrous EDTA, ferric/ferrous HEIDA, ferric/ferrous NTA, ferric/ferrous gluconate, and/or other ferric chelants, in combination with an oxidant, such as hydrogen peroxide, calcium peroxide, magnesium peroxide, ozone, persulfate, chlorite, hypochlorite, chlorine, bromine, permanganate, and/or chlorine dioxide, to produce highly reactive free and/or hydroxyl radicals to oxidize existing total sulfide to elemental sulfur. A second tier of treatment can be achieved through the addition of nitrate and/or nitrite from calcium, sodium, potassium, and/or ammonium nitrate/nitrite salts. It is suggested that nitrate/nitrite might react with the ferric/ferrous chelates to shift a selected ferrous chelate to ferric chelate that then reacts with sulfide to oxidize it to elemental sulfur. The remaining nitrate can act to stop further formation of sulfide under anaerobic conditions for lengthy periods of time, depending on nitrate dosage. The combination of various process steps can results in a system that can effectively treat existing total sulfide and/or prevent the formation of additional sulfide under extended anaerobic conditions that are conducive to biological sulfide formation.

It is not necessarily currently known with certainty exactly how certain embodiments might cause the reduction in concentration of the total sulfide contaminant. Nevertheless, the potential theory to describe the mechanism of the reaction is described by the inventor above.

Hydroxyl radicals can be generated during processes involving the catalyzed activation of hydrogen peroxide using such metals as iron, copper, manganese, and/or other transition metal compounds. One group of such processes is Fenton-type chemical reaction systems, which can employ ferrous salts and/or hydrogen peroxide in acidified (pH ~2 to ~3) soil and/or water suspensions.

In the classic Fenton reaction (Equation 1, below), ferrous ion rapidly reduces hydrogen peroxide to primarily hydroxyl radicals, which can react with and degrade a target contaminant. The classic Fenton reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

$$H_2O_2 + Fe^{2+} \rightarrow Fe^{3+} + HO^- + HO^* \quad \text{(Equation 1)}$$

A further description of Fenton-type reactions is provided in "Fenton's Reagent—Iron-Catalyzed Hydrogen Peroxide", which is published by US Peroxide, Laguna Niguel, Calif., at the web site h2o2.com/applications/industrial-wastewater/fentonsreagent.html, which is incorporated by reference herein in its entirety.

In the classic Fenton reaction, ferrous ion is required in stoichiometric amounts. Peroxide demand, and therefore, ferrous ion demand can be high in certain media, such as soil for example, due to competitive oxidation of soil organic matter and/or soil-catalyzed decomposition. Ferrous ion can be oxidized by the hydroxyl radicals, and therefore can compete with the target compounds unless its concentration is kept low by gradual addition in dilute form.

Ferric ion can also produce hydroxyl radicals from peroxide, albeit at a slower rate than ferrous ion. The use of ferric ion, however, typically requires acidic conditions to keep the iron soluble; the reaction has an optimum pH of about 3. In certain media, such as soil for example, acidification to an optimum pH of 3 can be challenging because soil can have a high buffering capacity. Moreover, because acidification itself can be viewed in at least some circumstances as a polluting practice, in some cases the soil must be excavated for treatment and neutralized before replacement. Similar concerns can exist for processes causing the acidification of contaminated water, air, vapors, and/or surfaces.

As used herein, the term "ferric chelate" means any one of a number of organic and inorganic polydentate ligands complexed with ferric ion, Fe(III). An "active" ferric chelate is one that exhibits activity toward oxidation of the contaminant to be degraded, i.e., is capable of generating free radicals and/or other reactive oxidants from an oxidant (also referred to as an "oxidizing agent" herein), such as a peroxide or a persulfate in the presence of a medium associated with the contaminant.

Certain exemplary embodiments are based, at least in part, on the surprising discovery that a particular novel active ferric chelate, Fe-GLC, and selected oxidizing agents unpredictably demonstrate significant activity at oxidizing contaminants associated with a medium above and beyond the activity which would be expected in the presence of the selected oxidizing agent alone.

Thus, certain exemplary embodiments comprise a method for reducing a concentration of a contaminant associated with a medium, comprising treating the medium with Fe-GLC and an oxidizing agent in amounts effective to oxidize at least a portion of the contaminant.

The oxidizing agent can be a peroxide, such as hydrogen peroxide, calcium peroxide, and/or magnesium peroxide, etc.; a persulphate, such as sodium persulphate, potassium persulphate, and/or ammonium persulphate, etc; ozone; a permanganate, such as sodium permanganate, potassium permanganate, etc; chlorine dioxide; a perchlorate, such as ammonium perchlorate, potassium perchlorate, etc.; and/or a halogen, such as chlorine, bromine, iodine, and/or fluorine, etc.

The medium can be any substance or material, such as solids, water, air, and fluid. For example, the medium can be a naturally occurring solid, such as earth, soil, clay, dust, sand, gravel, stone, rock, sediment, and/or activated charcoal. As another example, the medium can be any solid that is considered a waste, such as rubbish, trash, refuse, medical waste, radioactive waste, sweepings, scourings, rubble, debris, detritus, scum, grease, sludge, sewage, jetsam, and/or flotsam, etc.

As an example, the medium can be any anaerobic liquid, such as water, groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc.

As a further example, the medium can be any fluid, such as air, vapor, liquid, exhaust, and/or vent gas, etc. Moreover, the fluid can occupy a space defined at least in part by a structure, such as for example, a tunnel, mine, well, ditch, canyon, cavern, cave, hole, corner, niche, bunker, building, compartment, room, clean room, enclosure, container, tank, pipe, equipment, ship, airplane, vehicle, automobile, and/or train, etc.

Moreover, the medium can be any surface, including a surface of a building, compartment, facility, pavement, floor, flooring material, wall, divider, corner, door, window, shade, ceiling, roof, lid, tent, tarp, casing, envelope, covering, skin, wrapper, sheathing, veneer, surface, substrate, tray, ledge, shelf, container, fixture, appliance, equipment, machine, mechanism, apparatus, device, furniture, furnishing, protective gear, clothing, footwear, safety equipment, military product, military equipment, industrial product, industrial equipment, commercial product, commercial equipment, consumer product, consumer equipment, unfinished product, unfinished equipment, laboratory equipment, laboratory device, laboratory supply, medical equipment, medical device, medical supply, decontamination chamber, vessel, storage tank, pipe, valve, pump, blower, tubing, duct, conveyance system, silo, tanker, well, and/or oil well, etc.

The contaminant can be any contaminating substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

As yet another example, the contaminant can be gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, and energetic compounds (e.g., TNT, RDX, NDMA, etc.), human and/or animal drugs and/or pharmaceuticals (e.g., endocrine disruptors, estrogen, steroids, antibiotics, pain relievers, caffeine, etc.), pesticides (including any compound used to deter and/or destroy pests, including herbicides, fungicides, insecticides, rodenticides, and the like, e.g., Dieldrin, Atrazine, IPC, 2,4-D, DDT, N—N-diethyltoluamide, etc.), plasticizers, chelants, fire retardants (e.g., tri (2-chloroethyl) phosphate), disinfectants (e.g., triclosan), detergent metabolites (e.g., 4-nonylphenol), chloroethenes, petroleum hydrocarbons, BOD and COD (biological oxygen demand/chemical oxygen demand) contributing compounds, polyfunctional oxygenated compounds, such as diethers and hydroxyethers, as well as aliphatic alcohols, ethers, carbonyls, ketones, alkanes, naphthalenes, lubricants, cyanides, complex cyanides, mercaptans, and/or virtually any other organic requiring treatment, etc.

Furthermore, the contaminant can be a biological, such as any lifeform, pest, plant, invertebrate, mollusk, nematode, insect, parasite, mold, fungi, protozoa, amoeba, bacteria, virus, prion, protein, and/or amino acid, etc.

Numerous embodiments are possible. The following exemplary embodiments are intended to merely illustrate, and not limit, the breadth and depth of embodiments that can fall within the scope of any current and/or future claims.
Method 100

FIG. 1 is a flowchart of exemplary embodiment of a method 100, which can begin at activity 1010 by determining the treatment parameters. Included in this determination can be activities such as sampling the medium to detect if sulfide contaminant is present, analyzing the sample or the medium to determine the concentration of the sulfide contaminant, determining an amount of the medium to treat, determining where to treat the medium (e.g., distance upstream within flow), and/or determining temperatures, pressures, and/or flowrates of the medium, the ferric/ferrous chelate, and/or the amount of oxygen and/or oxidizing agent required.

At activity 1020, effective amounts of the ferric/ferrous chelate can be prepared. One method of preparing ferric/ferrous chelate is to directly mix with a chelated agent a source of ferric ion, such as an aqueous solution of a ferric salt, such as ferric perchlorate, ferric nitrate, ferric citrate, ferric malate, ferric lactate, and/or ferric oxalate, etc. Numerous chelating agents are available that can work with equal effectiveness, such as sodium gluconate (GLC), sodium nitriloacetate NTA), sodium methylglucine diacetate (MGDA), and/or sodium ethyldiaminetricacetate (EDTA). Another method is to mix a liquid ferric chloride solution with a chelating agent, such as sodium gluconate. Ferric chloride can be purchased as a ~13% ferric solution with a pH of about 1.0 to about 1.5 from Univar, 825 Fisher Street, Martinsville, Va., in 55 gallon drum and tanker load quantities.

If sodium gluconate (which is sometimes referred to as simply "gluconate") is selected as the chelating agent, it can be purchased from Jungbunzlauer AG, St. Alben-Vorstadt 90, CH-4002, Basel, Switzerland. It can be purchased in a powdered concentrate in 25 kg bags and 1000 kg bags. Sodium gluconate is the sodium salt of gluconic acid, which can be produced by fermentation of glucose. It can be white to tan in color, granular to fine in particle size, very soluble in water, non-corrosive, non-toxic, and/or readily biodegradable (98% after 2 days).

Formulation of one liter of the ferric chelate, ferric/ferrous gluconate (Fe-GLC) can be made by adding approximately 52.3 milliliters (~27 grams of GLC—Na3 depending on density) of sodium gluconate to approximately 800 milliliters of water. This solution can be then mixed continuously with a magnetic stir bar and/or other mechanical mixing technique. Liquid ferric chloride solution can be added to the solution while the pH of the mixture is monitored. The pH of gluconate/water mixture can be adjusted from approximately 10 to approximately 12 initially with sodium hydroxide. Ferric chloride then can be added until the pH of the solution comes down to a pH of approximately 7.2. Water can be added to achieve a final volume of approximately 1000 millimeters. At this point the Fe-GLC can be ready for use. Different volumes can be produced by scaling-up or scaling-down this formulation as desired. In certain exemplary embodiments, liquid ferric chloride solution can be added to GLC as a concentrated water/liquid mixture at approximately 40% sodium gluconate to approximately 60% water with a final pH of the ferric gluconate solution being approximately 7.2 after the ferric chloride titration. Higher or lower molar solutions can also be prepared.

The chelating agent MGDA, which is sometimes referred to as methylglycinediacetate and/or as tri sodium methylglycinediacetate, can be purchased from BASF Corp, 3000 Continental Drive—North, Mount Olive, N.J., 07828-1234, under their product name, Trilon M. It can be purchased as an approximately 39% concentrated liquid in 55 gallon drum and tanker load quantities. Trilon M has a density of approximately 1.29 to approximately 1.33 g/cm3, a pH of approximately 10.0 to approximately 12.0, and a molecular weight of MGDA-Na3: 271.

Formulation of one liter of the ferric chelate Fe-MGDA (sometimes referred to herein as VTX) can be made by adding approximately 52.3 milliliters (~27 grams of MGDA—Na3 depending on density) of Trilon M liquid to approximately 800 milliliters of water. This solution can be then mixed continuously with a magnetic stir bar and/or other mechanical mixing technique. Liquid ferric chloride solution can be added to the solution while the pH of the mixture is monitored. The pH of Trilon M/water mixture can be from approximately 10 to approximately 12 initially. Ferric chloride can be added until the pH of the solution comes down to a pH of approximately 5.0. Water can be added to achieve a final volume of approximately 1000 millimeters. At this point the Fe-MGDA can be ready for use. Different volumes can be produced by scaling-up or scaling-down this formulation as desired. In various alternative embodiments, liquid ferric chloride solution can be added to undiluted MGDA. Higher and/or lower molar solutions can also be prepared.

Formulation of a nitrate solution, which can enhance the long term treatment effect of this procedure, can be made by adding sodium nitrate, calcium nitrate, nitric acid, and/or any other salt of nitrate to a ferro chelate solution to attain a final concentration of nitrate in a range of approximately 3.5 M to approximately 4.5 M with a final ferro chelate concentration in a range of approximately 0.05 M to approximately 1.0 M. A typical formulation might be a 4.2 M nitrate and 0.1 M ferro chelate mixture.

Oxygen addition, as either a pure commercially available oxygen, a pure oxygen that might be made at the sight of treatment, and/or as introduced through compressed atmospheric oxygen, should be introduced at a minimum concentration of 1.5 times the amount of available sulfide to be treated within an anaerobic wastewater stream. Dosages of oxygen can exceed sulfide concentrations from approximately 3 to approximately 4 times on a mass to mass basis. Higher dosages of oxygen can further speed the reaction efficiency.

The Fe-GLC, Fe-MGDA, and/or numerous other ferro chelates can be applied to a contaminated medium before, during, in combination with, and/or after oxygen and/or air in amounts and/or concentrations effective to degrade, and/or substantially reduce, the concentration of, the target sulfide contaminant. The amounts of Fe-GLC, Fe-MGDA, and/or other ferro chelates and oxygen and/or air needed and/or utilized can depend upon, for example, the concentration of the sulfide contaminant to be degraded, the available reaction time, temperature of the reactants (e.g., the Fe-GLC, Fe-MGDA, and/or other ferro chelates, the oxygen/air, and/or the contaminated medium), and/or the organic matter content of the medium.

In certain exemplary embodiments, the Fe-GLC, Fe-MGDA, and/or other ferro chelates and oxygen and/or air can be mixed, and even conveyed, before being applied to the contaminated medium. In certain exemplary embodiments, the Fe-GLC, Fe-MGDA, and/or other ferro chelates and the oxidizing agent can mix while in contact with the contaminated medium.

At activity 1030, the Fe-GLC, Fe-MGDA, and/or other ferro chelates and oxygen can be applied to the contaminant, the medium, and/or the contaminated medium. Either of the Fe-GLC, Fe-MGDA, and/or other ferro chelates and the oxidizing agent can be applied as liquid or vapor.

For example, a ferric chelate and an oxidizing agent can contact the contaminated medium in the presence of water, such as in an aqueous soil slurry. In this context, the term "slurry" can mean a mixture containing sufficient water to moisten and saturate the soil and coat the soil particles, i.e., making "mud". In certain exemplary embodiments, sufficient water can be utilized to actually suspend the soil particles.

In certain exemplary embodiments involving soil, chelate and oxidizing agent solutions can be employed, and these can simply be added to the soil at ambient temperature, so long as there is sufficient water present in the final mud to allow penetration of the ingredients. Also, more concentrated oxidizing agent and chelate solutions can be mixed into soil that has been recently moistened or watered. Moreover, oxidizing agent and chelate can be sprayed on freshly plowed earth, and sunlight can speed degradation. In certain exemplary embodiments, ultra-violet light and/or other forms of light, radiation, and/or energy, etc., can be utilized to speed degradation.

At activity 1040, the reaction between the Fe-GLC, Fe-MGDA, and/or other ferro chelates, oxygen and/or air, and the contaminant can be monitored, adjusted, and/or controlled. For example, included in this activity can be activities such as sampling the medium to detect if a contaminant is still present, analyzing the sample or the medium to identify what contaminant remains and/or to determine what concentrations of the contaminant remain, and/or monitoring, adjusting, and/or controlling temperatures, pressures, and/or flowrates of the contaminated medium, the Fe-GLC, Fe-MGDA, and/or other ferro chelates, the oxygen and/or air, and/or the decontaminated medium.

To increase the temperature, pressure, and/or rate of the reaction, an accelerant can be added to, for example, the contaminated medium, the ferric chelate (e.g., Fe-GLC), the oxidizing agent, and/or the reacting mixture. Such an accelerant can be, for example, an organic compound and/or biological that can react rapidly with the ferric chelate and the oxidizing agent. Such an approach could be useful for fragmenting soil clods that contain a relatively low-level of contaminant, thereby increasing the available surface area of the soil and decreasing the time required to contact the contaminant with the other reactants, and/or decreasing the amount of ferric chelate and/or oxidizing agent. Similarly, a non-toxic organic accelerant could be put into sub-surface groundwater to cause substantial bubbles to be formed during the reaction, thereby lifting the reactants and/or oxidants up to the soil/water interface where the target contaminants might be located.

During the reaction, at least a portion of the contaminant can be oxidized, decontaminated, and/or sanitized. In the case of biologicals, the reaction can kill a life form, render ineffective an amino acid, and/or denature a protein. The reaction can be particularly handy for decontaminating a cleanroom, sanitizing military equipment, and/or reducing a concentration of a contaminant associated with bio-terrorism. As a result of the reaction, the concentration of the contaminant can be reduced by a factor of, for example, at least 2, 5, 10, 20, 50, 100, 200, 500, 1000, 2000, 5000, 10000, 20000, and/or 50000, etc., and/or a factor between any of those values.

Heat generated by the reaction can be captured, transferred, and/or utilized. For example, the reaction can occur within a reactor vessel that is surrounded by cooling coils. The heat absorbed by a heat transfer fluid circulating in the coils can be used for any heating purpose, such as to dry the decontaminated medium (e.g., to de-water decontaminated soil and/or to dry a decontaminated surface), and/or to heat another process, fluid, and/or environment.

Moreover, the reaction can occur with such intensity as to create a controlled and/or uncontrolled explosion. A controlled explosion can be used, for example, to generate propulsion, and/or to create a mechanical cleaning effect. As a further example, the pressure, temperature, and/or decontamination caused by a sufficiently rapid reaction down-hole in an oil well can "frac" the well, thereby removing and/or dislodging substances clogging the well and improving a flowrate of the oil well.

The reaction can be allowed to run its course, and/or can be halted, for example, before complete oxidation of the contaminant has occurred. Adding an additional oxidizable substance to the medium, thereby diverting some of the reactants and/or oxidants to the additional substance and/or consuming the oxidants' oxidizing capability can cause such a halting. Moreover, such a halting of the reaction, or at least a decrease in the reaction rate, can also occur by reducing and/or limiting the flow of the reactants (e.g., either Fe-GLC, the oxidizing agent, the contaminated medium, and/or the additional oxidizable substance), changing the concentration of any of the reactants, lowering the temperature of any of the reactants, and/or by withdrawing heat generated by the reaction.

After the reaction, the medium can be treated to reduce a concentration of iron associated with the medium. The medium can also be re-treated to further reduce a concentration of the contaminant.

At activity 1050, the decontaminated medium can be disposed. Prior to disposal, however, the medium can be sampled to detect if any sulfide contaminant is still present. Further, a determination can be made regarding how much reduction has occurred in the target sulfide contaminant.

The decontaminated medium can be conveyed to a disposal site, and/or can be discharged at the disposal site. The disposal site can be, for example, a waterway, an injection well, and/or a landfill.

System 200

Figure 2:
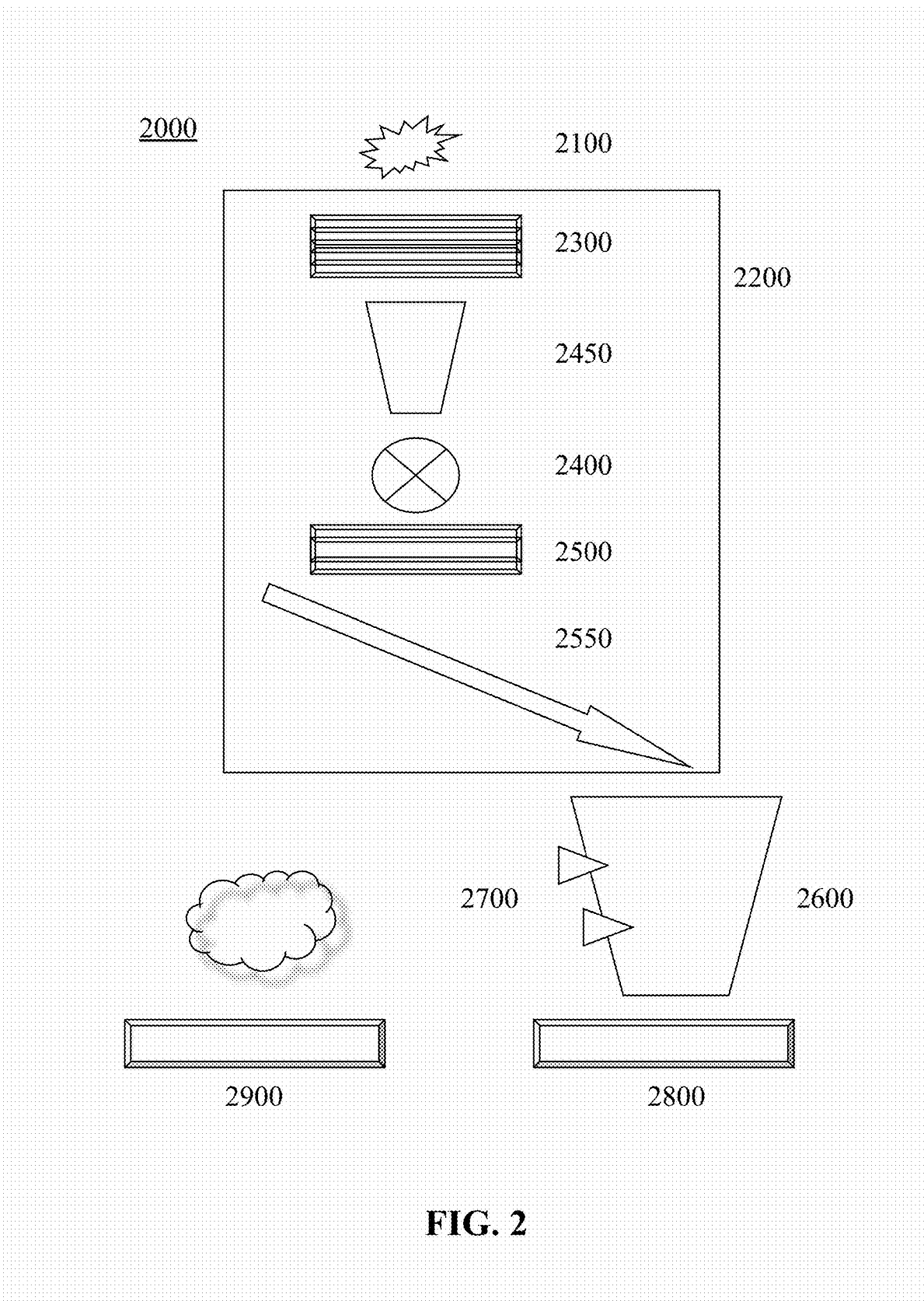
FIG. 2 is a block diagram of an exemplary embodiment of a system 2000.

FIG. 2 illustrates a system 200 for treating a sulfide contaminated medium.

Aliquots of contaminated wastewater can be exposed to varying levels of oxygen and/or air and Fe-GLC, Fe-MGDA, and/or other ferro chelates. Once treated, the wastewater can be tested for the target contaminants to determine the efficacy of individual dose rates. Generally speaking, an effective dose rate can be approximately 2 cubic centimeters of oxygen for moderately contaminated wastewater (i.e. ~10 mg/l of sulfide contaminant in wastewater) and/or approximately 0.05 milliters of approximately 0.3 to approximately 1.0 M Fe-GLC, Fe-MGDA, and/or other ferro chelates per liter. Deviations from this range can be employed.

Once the appropriate dosage of oxygen and/or air and Fe-GLC, Fe-MGDA, and/or other ferro chelates are determined, the sulfide contaminated wastewater can be demonstrated on a pilot scale by diffusing oxygen in-line from approximately 3 minutes to approximately 30 minutes upstream of the exit point of the wastewater to atmosphere. Fe-GLC, Fe-MGDA, and/or other ferro chelates can be metered into the line above the oxygen diffusion point via a typical metering pump. Metering of Fe-GLC, Fe-MGDA, and/or other ferro chelates came be accomplished just prior to or just after oxygen and/or air diffusion, or upstream at the nearest available access point within approximately 8 hours of contact between the Fe-GLC, Fe-MGDA, and/or other ferro chelates dosage point and the oxygen and/or air addition point.

Certain exemplary embodiments can be used to reduce contaminants associated with surfaces, solids, water, air, and/or fluids generally. Certain exemplary embodiments can cause insignificant sludge production, can work on cloudy effluents, and/or can work at circumneutral pH. For certain exemplary embodiments, the Fe-GLC and/or oxidizing agent can be in any fluid form, including liquid, vapor, foam, and/or aerosol form.

Certain exemplary embodiments can be implemented as stand-alone systems, combined with each other, and/or with pre-treatment processes such as bioremediation and/or solids separation. Certain exemplary embodiments can be fully integrated, self-contained, skid-mounted, portable, weatherproof, tolerant of suspended dissolved solids and color, highly energy efficient, remotely monitored, equipped with 100 percent duplicity of all components, and/or fully automatically PLC controlled. Certain exemplary embodiments have built-in heating; venting; sump; digital operator interface; and/or flow, concentration, pH, temperature, and/or pressure instrumentation and/or controls.

Part 2: Example Set A

Example 1: Bench Treatment Water Treatment Using Fe-GLC

Table 2 shows pre-treatment and post-treatment concentrations (in parts per million) of numerous contaminants in water, the contaminated water treated according to certain exemplary embodiments. Each of the contaminants was dissolved in separate flasks containing one liters of water. Each of the flasks was treated with 1.0 ml of Fe-GLC (0.1M) and 1.0 ml of 35% hydrogen peroxide.

TABLE 2

| Contaminant | CAS # | Before Treatment (ppm) | After Treatment (ppm) |
|---|---|---|---|
| Benzene | 71-43-2 | 110.0 | ND* |
| Toluene | 108-88-3 | 121.3 | ND |
| Trichloroethane | 79-01-6 | 354.2 | ND |
| Tetrachloroethane | 127-16-4 | 136.2 | 24.3 |
| Ethylbenzene | 100-41-4 | 80.3 | ND |
| Hydrogen Sulfide | 7783-06-4 | 100.0 | ND |

Note: ND indicates non-detectible.

Example 2: A Comparative Treatment of 2,4-Dichlorophenoxyacetic Acid (2,4-D) with Hydrogen Peroxide Alone Against Hydrogen Peroxide/Fe-Gluconate A solution containing 1.5 L of distilled water, approximately 0.2 g of sodium bicarbonate, and a small amount of sodium salt of 2,4-D were prepared with magnetic stirring at room temperature in a 2.5 L flask. The dissolved sodium bicarbonate increased the alkalinity of the water somewhat, causing the water to mimic a natural water source. Two hundred fifty milliliters of this solution was distributed into three 500 mL Erlenmeyer flasks. Flask one served as a control and had no Fe-GLC or hydrogen peroxide added to it and was labeled "untreated". Two hundred microliters of 50% hydrogen peroxide was added to flask two and the flask was labeled "oxidizing agent only". Flask three received 200 microliters of 50% hydrogen peroxide and 200 microliters of Fe-GLC and was labeled "Treated w/ oxidizing agent and VTXF".

The flasks were then covered with parafilm and swirled to facilitate mixing of the solution. After four hours a sample from each flask was taken to the pesticide lab at Virginia Tech and analyzed by gas chromatography (GC) for 2,4-D. The findings were as follows:

TABLE 3

Results of 2,4-D Treatments Comparing H2O2 and H2O2 with Fe-GLC

| Sample Description | Lab ID # | 2,4-D |
|---|---|---|
| Untreated | S-O 4001 | 130 ppb |
| Oxidizing agent Only | S-O 4002 | 230 ppb |
| Treated w oxidizing agent & VTXF | S-O 4003 | 2.5 ppb |
| Rinsate sample 1 | N/A | 0.08 ppb |
| Rinsate sample 2 | N/A | 0.02 ppb |
| Rinsate sample 3 | N/A | 0.01 ppb |

Results indicate that the hydrogen peroxide had no affect on the 2,4-D when added alone. However, hydrogen peroxide along with the Fe-GLC ("VTXF") catalyst substantially reduced the concentration of the 2,4-D, indicating that the catalyzed process was a much more vigorous oxidative process than hydrogen peroxide alone.

Example 3: Treatment of Groundwater Contaminated with BTEX and MtBE Using Hydrogen Peroxide Alone and Hydrogen Peroxide with Fe-GLC A groundwater sample known to contain benzene, toluene, ethylbenzene, xylenes and methyl tert-butyl ether (MtBE) was divided into three separate 250 milliliter aliquots and placed into 500 milliliter beakers. Nothing was added to beaker one, one milliliter of 35% hydrogen peroxide was added to the second beaker and one milliliter of 35% hydrogen peroxide along with 1 milliliter of Fe-GLC was added to the third beaker. Each sample was stirred gently with a glass stirring rod to assure mixture of the liquids with the sample. The samples were poured into individual sample containers and taken to the laboratory for analysis. The findings were as follows:

TABLE 4

Results of BTEX/MtBE Treatments Comparing
H2O2 Alone Against H2O2 and Fe-GLC

| Analysis BTEX SW 846 8260 | Untreated (ppb) | H2O2 Only (ppb) | H2O2 w/ Fe-GLC (ppb) |
|---|---|---|---|
| Benzene | 56 | 15.1 | ND |
| Ethylbenzene | 34 | 13.0 | ND |
| Toluene | 171 | 55.7 | ND |
| Xylenes | 159 | 67.0 | ND |
| MtBE | 27 | 15.7 | 1.8 |

ND = non detectible

The results indicate that the hydrogen peroxide/Fe-GLC mixture was a more effective method for degrading the target compounds.

Example 4: Comparison of Peroxide Alone to Fe-GLC and Peroxide for Disinfecting Wastewater A sample of wastewater was collected from the influent of the chlorine contact chamber of the York River Wastewater Treatment Plant in Yorktown, Va. The samples were divided equally into three clean 500 milliliter sample containers from the single sample taken. The first sample served as a control and was set aside. Twenty milligrams of hydrogen peroxide was added to the second sample (50 microliters of 35% hydrogen peroxide). Twenty milligrams of hydrogen peroxide (50 microliters of 35% H2O2) was added to the third container along with 50 microliters of Fe-GLC. Each sample was capped and shaken briefly to mix the contents. After twenty minutes, sub-samples were taken from each vessel and pored into fecal coliform sample containers for analysis at the Hampton Roads Sanitary District lab. The findings were as follows:

TABLE 5

Bacterial Disinfection Using Fe-GLC

| Sample ID | Fecal Coliform* # cfu/100 mL |
|---|---|
| Control | 2200 |
| H2O2 Only | 53 |
| H2O2/FeGLC | <1 |

*cfu = colony forming units

Results indicate that the VTXF sample was more effective in disinfecting the treated municipal wastewater. Fifty three CFUs/100 mls remained in the hydrogen peroxide only test while no detectable CFUs were indicated in the VTXF sample. Both treatments reduced fecal coliforms substantially from the control.

Example 5: Disinfection of Wastewater Using a Variety of Chelated Iron Compounds Wastewater collected from the aeration basin of the County of Spotsylvania, Virginia's Massaponax Wastewater Treatment Plant was treated with hydrogen peroxide alone and separately with a combination of hydrogen peroxide and a variety of individual chelated iron products, to assess the difference, if any, between the disinfection capabilities of hydrogen peroxide alone against hydrogen peroxide catalyzed with the various chelated iron products.

If the chelated iron products are capable of producing hydroxyl radicals in the presence of hydrogen peroxide, it is believed that a marked improvement will be noted between those samples treated with peroxide alone and those with hydrogen peroxide plus a chelated iron product.

A 10 gallon sample of wastewater from the Massaponax Wastewater Plant was collected and allowed to sit undisturbed for thirty minutes. The clarified supernatant was then pored off of the top of the settled solids within the sample. The supernatant was then mixed and four samples were collected to determine untreated heterotrophic bacteria counts.

The four chelants selected were as follows:

1. HEIDA (N-2(2-hydroxyethyliminodiacetic acid)
2. EDTA (ethylenediaminetetracetic acid)
3. NTA (nitrilotriacetic acid)
4. Gluconic Acid Chelants were dissolved in distilled water at 0.4334M. Ferric chloride was added in amounts to achieve saturation of chelant sites on the respective chelants. This was achieved by adding ferric chloride until a pH of 4 was achieved and then titrating each chelant-iron mixture with sodium hydroxide until a pH of 7 was achieved. Iron oxide precipitate was noted in each sample as the pH rose, indicating saturation of the chelated sites had occurred for each chelant.

Twenty individual liter samples of supernatant were then decanted from the well-mixed wastewater sample for testing. Four chelated iron products with peroxide were tested at two test concentrations and compared to samples receiving peroxide only and iron chelate only. In Test 1, each of four liter test containers received a dose of 6 ppm of one of the iron chelates plus 19.8 ppm of hydrogen peroxide. Four additional four liter test containers received 19.8 ppm of hydrogen peroxide alone. In Test 2, this protocol was repeated with additional four liter test containers with twice the concentrations of each additive (i.e., 12 ppm iron chelant and 39.6 ppm hydrogen peroxide). Finally, in Test 3, each of four liter samples received a dosage of 12 ppm of iron chelant alone to test the effect, if any, of the chelant.

Individual samples were dosed with the respective additives, mixed with a magnetic stir bar and allowed to react for 30 minutes. Samples were then decanted to sterile sample containers containing sodium thiosulfate to stop the oxidation process and preserve the sample. Samples were then placed in a refrigerator until all samples were finished. Samples were packaged in a standard cooler with ice packs and sent via overnite delivery to ProChem Labs in Lynchburg, Va. for analysis for total heterotrophic bacteria counts.

Raw samples were reported to contain 17,600, 17,350, 16,200 and 21,600 colony forming units/ml (CFUs) for an average of 18,188 CFUs. Treated samples resulted in the data presented below:

TABLE 6

Bacterial Disinfection Using Chelated Iron Compounds

| Iron Chelant | Test 1 CFUs/ml | | Test 2 CFUs/ml | | Test 3 |
|---|---|---|---|---|---|
| | 19.8 ppm H2O2 Only | 19.8 ppm $H_2O_2$ 6 ppm Fe-Chelant | 39.6 ppm $H_2O_2$ Only | 39.6 ppm $H_2O_2$ 12 ppm Fe-Chelant | CFUs/ml 12 ppm Fe-Chelant |
| Fe-EDTA | 340 | 360 | 49 | 59 | 18,200 |
| Fe-HEIDA | 1070 | 1350 | 35 | 84 | 16,700 |
| Fe-NTA | 480 | 370 | 68 | 75 | 18,300 |
| Fe-GLU | 840 | 98 | 330 | 28 | 22,600 |

Table 6 indicates that the hydrogen peroxide alone is a good disinfectant. From these data it is possible to say that Fe-EDTA, Fe-HEIDA and Fe-NTA had very little effect on viable cells beyond that exhibited by hydrogen peroxide alone. However, it appeared that the disinfection in the samples receiving ferric gluconate (Fe-GLU) and peroxide were better than peroxide alone, particularly in the case of the lower dosage rate. It is more difficult to make an assessment in Test 2 for Fe-GLU because of the elevated peroxide-only test sample which was considerably higher than the other three peroxide-only samples in this test. However, the test results were improved for the Fe-GLU as compared to the other three ferric chelants plus peroxide tests.

Test 3, which received ferric chelants only, approximated the raw sample test results. Average results for this test was 18,950 CFUs/ml as compared to 18,188 CFUs/ml for the raw untreated sample average.

Example 6: Treatment of Sulfides in Municipal Wastewater Using a Variety of Ferric Chelants and Hydrogen Peroxide A variety of ferric chelants in combination with hydrogen peroxide were tested to determine their impact on the efficiency of treatment of sulfide in wastewater compared to samples of wastewater treated with hydrogen peroxide only. It has been demonstrated in a previous study presented herein that a combination of ferric gluconate and hydrogen peroxide was very effective in reducing the concentration of sulfide within a test sample. However, since it is known that hydrogen peroxide will treat sulfide without the aid of a ferric chelant, it was decided to conduct studies with ferric gluconate and a variety of other ferric chelants to determine if an improvement to the efficiency of treatment within 30 minutes could be accomplished above and beyond what could be achieved with hydrogen peroxide alone.

Seven chelants were chosen for the study as follows:
 1. HEIDA (N-2(2-hydroxyethyliminodiacetic acid)
 2. EDTA (ethyl enediaminetetracetic acid)
 3. NTA (nitrilotriacetic acid)
 4. Gluconic acid
 5. Gallic acid
 6. Ascorbic acid
 7. Citric acid Chelants 1 through 3 represent the class of chelants known as the aminopolycarboxylates, gallic acid is a polyhydroxyaromatic, citric and ascorbic acid are classed as polycarboxylates and gluconic acid is sugar acid (aldonic acid). It was determined that a broad sampling of chelants from several different classes could determine if the production of oxidants and/or hydroxyl radicals from mixtures of ferric chelants and oxidizing agents was more likely to be an individual chemical phenomena or a chemical class phenomena.

Formulations of the various ferric chelants was accomplished by adding 35% ferric chloride to 0.3 Molar solutions of each chelant. Solutions of HEIDA, EDTA, and NTA, each of which had a high pH, were made by adding the appropriate amount of ferric chloride to the chelants to achieve saturation of available sites on the molecules. Since each of these three chelants had a starting pH of 11, 35% ferric chloride was added until a pH of 4 was attained. The pH was then raised to 7 using sodium hydroxide. Precipitation of iron oxides and/or hydroxides at this pH offered assurance of complete chelation of still soluble iron after 24 hours.

Gluconic, citric, and ascorbic acids were made by adding sodium hydroxide to 0.3 M solutions of each of the solutions until a pH of 11 was attained. The pH was then lowered to 4 as with the aminopolycarboxylates using 35% ferric chloride and then returned to pH 7 with sodium hydroxide to assure saturation of all chelation sites with ferric ions (Fe oxide precipitate noted after 24 hours).

Gallic acid is less soluble than all of the other chelants and was made up at 0.014 M to accommodate its solubility. The pH of gallic acid was adjusted to 11 as well. The pH was then lowered to 4 as with the aminopolycarboxylates using 35% ferric chloride and then returned to pH 7 with sodium hydroxide to assure saturation of all chelation sites with ferric ions (Fe oxide precipitate noted after 24 hours).

Total sulfides were tested for using Standard Methods 4500-$S^{2-}$ D with a Hach Chemical Company (of Loveland, Colo.) DR 2000 Spectrophotometer and reagents from Hach specific for this particular test. To keep total sulfides within the range of the test, samples were diluted with distilled water prior to conducting the test as per Hach instructions.

For testing Series One, a batch of raw influent wastewater from a local wastewater plant was spiked with sulfide to attain a final total sulfide concentration of 25.4 ppm (average of three samples taken of 26.3, 25.4, and 24.6 ppm). Each of the seven liter sample jars of the raw wastewater received a dose of 12 ppm of one of the seven ferric chelants (mass calculated as chelant) and 37.8 ppm of hydrogen peroxide on a staggered schedule to accommodate testing time. The 37.8 ppm of hydrogen peroxide represented a ratio of ~1.5:1 of peroxide to sulfide. Tests for total sulfide were conducted after 5, 15, and 30 minutes of contact time on each of the seven liter test jars. A second set of seven liter jars of wastewater was conducted using 37.8 ppm of hydrogen peroxide and 6 ppm of ferric chelants and tested on the same schedule as before. A third set of seven liter jars of wastewater was tested using 37.8 ppm of hydrogen peroxide dosing alone for each of seven vessels and tested over time as before. Finally, seven individual liter vessels received dosages of the ferric chelants only and were tested after 30 minutes to determine if the chelants alone had an effect on sulfide.

The tests resulted in the following tabulated data:

TABLE 7

Series One Studies - 1.5:1.0 Peroxide to Sulfide Ratio and Two Chelate Dosages
Ferric EDTA Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 18.3 | 18.6 | 18.6 | |
| 15 | 9.9 | 12.8 | 15.3 | |
| 30 | 8.0 | 9.1 | 11.3 | 24.4 |

*Hydrogen peroxide at 37.8 ppm for all Doses except Dose 4.

TABLE 8

Series One Studies - 1.5:1.0 Peroxide to Sulfide Ratio and Two Chelate Dosages
Ferric NTA Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 15.2 | 15.9 | 17.9 | |
| 15 | 6.8 | 12.6 | 13.8 | |
| 30 | 5.5 | 7.9 | 10.4 | 24.6 |

*Hydrogen peroxide at 37.8 ppm for all Doses except Dose 4.

TABLE 9

Series One Studies - 1.5:1.0 Peroxide to Sulfide Ratio and Two Chelate Dosages
Ferric HEIDA Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 20.0 | 20.3 | 20.0 | |
| 15 | 16.5 | 16.4 | 14.4 | |
| 30 | 14.2 | 14.9 | 13.6 | 25.2 |

*Hydrogen peroxide at 37.8 ppm for all Doses except Dose 4.

TABLE 10

Series One Studies - 1.5:1.0 Peroxide to Sulfide Ratio and Two Chelate Dosages
Ferric Gluconate Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 14.2 | 15.9 | 20.2 | |
| 15 | 7.3 | 11.5 | 14.8 | |
| 30 | 4.3 | 7.4 | 11.1 | 24.9 |

*Hydrogen peroxide at 37.8 ppm for all Doses except Dose 4.

TABLE 11

Series One Studies - 1.5:1.0 Peroxide to Sulfide Ratio and Two Chelate Dosages
Ferric Gallate Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 18.4 | 18.0 | 18.1 | |
| 15 | 14.0 | 13.6 | 13.9 | |
| 30 | 10.4 | 11.2 | 10.9 | 24.7 |

*Hydrogen peroxide at 37.8 ppm for all Doses except Dose 4.

TABLE 12

Series One Studies - 1.5:1.0 Peroxide to Sulfide Ratio and Two Chelate Dosages
Ferric Citrate Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 17.8 | 18.1 | 18.9 | |
| 15 | 14.1 | 15.8 | 15.8 | |
| 30 | 10.5 | 12.4 | 11.3 | 25.0 |

*Hydrogen peroxide at 37.8 ppm for all Doses except Dose 4.

TABLE 13

Series One Studies - 1.5:1.0 Peroxide to Sulfide Ratio and Two Chelate Dosages
Ferric Ascorbate Study*

| | Sulfide Remaining (ppm) | | | |
|---|---|---|---|---|
| Contact Time (Minutes) | Dose 1 12 ppm Chelant | Dose 2 6 ppm Chelant | Dose 3 H2O2 Only | Dose 4 Chelant Only |
| 0 | 25.4 | 25.4 | 25.4 | 25.4 |
| 5 | 16.6 | 17.2 | 17.8 | |
| 15 | 11.8 | 12.4 | 14.2 | |
| 30 | 9.6 | 10.4 | 11.5 | 24.6 |

*Hydrogen peroxide at 37.8 ppm for all Doses except Dose 4.

For testing Series Two, a second batch of raw influent wastewater from the same local wastewater plant was spiked with sulfide to attain a total sulfide concentration of 42.3 ppm (average of three samples taken of 42.7, 40.6, and 43.5 ppm). Each of seven liter sample jars of the raw wastewater received a dose of 20 ppm of one of the seven ferric chelants (mass calculated as chelant) and 105.8 ppm of hydrogen peroxide on a staggered schedule to accommodate testing time. The 105.8 ppm of hydrogen peroxide represented a ratio of ~2.5:1 of peroxide to sulfide. Tests for total sulfide were conducted after 5, 15, and 30 minutes of contact time on each of the seven liter test jars. A second set of seven liter jars of wastewater was tested using 105.8 ppm of hydrogen peroxide and 10 ppm of ferric chelants and tested on the same schedule as before. A third set of seven liter jars of wastewater was tested using 105.8 ppm of hydrogen peroxide dosing alone for each of seven vessels and tested over time as before. Finally, seven individual liter vessels received dosages of the ferric chelants only at 20 ppm and were tested after 30 minutes to determine if the chelants alone had an effect on sulfide.

TABLE 14

Series Two Studies - 2.5:1.0 Peroxide to Sulfide Ratio and Two Chelate Dosages
Ferric EDTA Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 25.8 | 27.4 | 29.4 | |
| 15 | 16.9 | 18.9 | 20.3 | |
| 30 | 5.3 | 6.9 | 13.1 | 41.7 |

*Hydrogen peroxide at 105.8 ppm for all Doses except Dose 4.

TABLE 15

Series Two Studies - 2.5:1.0 Peroxide to Sulfide Ratio and Two Chelate Dosages
Ferric NTA Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 23.3 | 26.7 | 29.4 | |
| 15 | 12.6 | 16.3 | 21.2 | |
| 30 | 2.8 | 4.2 | 12.9 | 41.0 |

*Hydrogen peroxide at 105.8 ppm for all Doses except Dose 4.

TABLE 16

Series Two Studies - 2.5:1.0 Peroxide to Sulfide Ratio and Two Chelate Dosages
Ferric HEIDA Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 25.3 | 27.1 | 30.6 | |
| 15 | 19.8 | 18.9 | 20.1 | |
| 30 | 12.9 | 14.0 | 13.6 | 41.5 |

*Hydrogen peroxide at 105.8 ppm for all Doses except Dose 4.

TABLE 17

Series Two Studies - 2.5:1.0 Peroxide to Sulfide Ratio and Two Chelate Dosages
Ferric Gluconate Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 18.6 | 23.5 | 29.3 | |
| 15 | 5.6 | 7.3 | 19.4 | |
| 30 | 1.1 | 2.2 | 14.2 | 43.0 |

*Hydrogen peroxide at 105.8 ppm for all Doses except Dose 4.

TABLE 18

Series Two Studies - 2.5:1.0 Peroxide to Sulfide Ratio and Two Chelate Dosages
Ferric Gallate Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 29.2 | 27.8 | 29.4 | |
| 15 | 20.2 | 22.2 | 22.0 | |
| 30 | 13.2 | 13.1 | 14.2 | 43.0 |

*Hydrogen peroxide at 105.8 ppm for all Doses except Dose 4.

TABLE 19

Series Two Studies - 2.5:1.0 Peroxide to Sulfide Ratio and Two Chelate Dosages
Ferric Citrate Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 30.1 | 29.9 | 28.9 | |
| 15 | 19.6 | 20.2 | 20.2 | |
| 30 | 14.3 | 12.9 | 13.0 | 42.0 |

*Hydrogen peroxide at 105.8 ppm for all Doses except Dose 4.

TABLE 20

Series Two Studies - 2.5:1.0 Peroxide to Sulfide Ratio and Two Chelate Dosages
Ferric Ascorbate Study*

| Contact Time (Minutes) | Sulfide Remaining (ppm) | | | |
|---|---|---|---|---|
| | Dose 1 20 ppm Chelant | Dose 2 10 ppm Chelant | Dose 3 H2O2 Only | Dose 4 Chelant Only |
| 0 | 42.3 | 42.3 | 42.3 | 42.3 |
| 5 | 26.9 | 27.2 | 30.1 | |
| 15 | 17.7 | 19.7 | 21.2 | |
| 30 | 10.8 | 11.9 | 12.6 | 41.8 |

*Hydrogen peroxide at 105.8 ppm for all Doses except Dose 4.

Calculations of the percentage of sulfide treated after 30 minutes of contact were performed to assess the efficacy of the ferric chelates as compared to hydrogen peroxide treatments alone. These data follow:

TABLE 21

Percentage of Sulfide Treated After 30 Minutes - 1.5:1.0 Ratio of Peroxide to Sulfide

| Fe Chelant | Percentage of Sulfide Treated | | |
|---|---|---|---|
| | Dose 1 12 ppm Chelant 37.8 ppm H2O2 | Dose 2 6 ppm Chelant 37.8 ppm H2O2 | Dose 3 38.7 ppm H2O2 Only |
| Fe EDTA | 68.5 | 64.2 | 55.5 |
| Fe NTA | 78.3 | 68.9 | 59.0 |
| Fe HEIDA | 44.1 | 41.3 | 46.5 |
| Fe Gluconate | 83.1 | 70.8 | 56.3 |
| Fe Gallate | 59.1 | 55.9 | 57.0 |

TABLE 21-continued

Percentage of Sulfide Treated After 30 Minutes -
1.5:1.0 Ratio of Peroxide to Sulfide Percentage of Sulfide Treated

| Fe Chelant | Dose 1<br>12 ppm Chelant<br>37.8 ppm H2O2 | Dose 2<br>6 ppm Chelant<br>37.8 ppm H2O2 | Dose 3<br>38.7 ppm H2O2<br>Only |
|---|---|---|---|
| Fe Citrate | 58.7 | 51.2 | 55.5 |
| Fe Ascorbate | 62.2 | 59.0 | 54.7 |

TABLE 22

Percentage of Sulfide Treated After 30 Minutes -
2.5:1.0 Ratio of Peroxide to Sulfide

| Fe Chelant | Dose 1<br>20 ppm Chelant<br>105.8 ppm H2O2 | Dose 2<br>10 ppm Chelant<br>105.8 ppm H2O2 | Dose 3<br>105.8 ppm H2O2 Only |
|---|---|---|---|
| Fe EDTA | 87.5 | 83.7 | 69.0 |
| Fe NTA | 93.4 | 90.0 | 69.5 |
| Fe HEIDA | 69.5 | 66.9 | 67.8 |
| Fe Gluconate | 97.4 | 94.8 | 66.4 |
| Fe Gallate | 68.7 | 69.0 | 44.4 |
| Fe Citrate | 66.2 | 69.5 | 69.3 |
| Fe Ascorbate | 74.5 | 71.9 | 70.2 |

It is apparent from these data that three ferric chelates stand out from the seven tested. Ferrics EDTA, NTA, and Gluconate were noticeably better over 30 minutes of treatment than hydrogen peroxide alone. Also, there was no significant treatment noted within the ferric chelates alone indicating that the treatment of sulfide within wastewater was substantially improved in the ferric chelate and peroxide combination for these three ferric chelates.

Ferric HEIDA, which is within the family aminopolycarboxylate, did not perform well as compared to Ferric EDTA and NTA alone which suggests that the treatment efficacy may not be related to families of similar chemistry.

Ferric gallate and ascorbate did not perform well overall, although ferric ascorbate did show some modest improvement over hydrogen peroxide treatment alone.

The rate of treatment was also improved for samples receiving Ferrics EDTA, NTA, and Gluconate. After 15 minutes, hydrogen peroxide alone averaged 52% sulfide reduction in the 2.5:1.0 peroxide to sulfide treatments as compared to 60%, 70.2%, and 86.8% reduction, respectively, for the 20 ppm of Fe EDTA, Fe NTA, and Fe Gluconate and 105.8 ppm hydrogen peroxide treatments. Improved rates were also noted in the lower treatment level of 12 ppm chelant and 37.8 ppm hydrogen peroxide. Respective sulfide treatment for Fe EDTA, Fe NTA, and Fe Gluconate were 61%, 73%, and 70% as compared to 42.9% for peroxide alone. All of the other ferric chelants approximated the treatment rates of hydrogen peroxide alone.

It is concluded from this example that:
1. Ferric EDTA, ferric NTA, and ferric Gluconate significantly improve the overall efficiency of sulfide treatment after 30 minutes of treatment over peroxide alone.
2. Ferric EDTA, ferric NTA, and ferric Gluconate significantly improve the rate of treatment of sulfide over hydrogen peroxide alone.
3. The efficacy of sulfide treatment is chelant specific and is not necessarily tied to classes of chelants. Therefore, success in treatment is unique to selected, individual ferric chelants.
4. Higher concentrations of ferric EDTA, ferric NTA, and ferric Gluconate in combination with higher concentrations of hydrogen peroxide improves both overall efficiency of treatment and the rate of treatment.

Example 7: Treatment of Sulfides in Municipal Wastewater Using a Variety of Ferric Chelants and Ozone A variety of ferric chelants in combination with ozone were tested to determine their impact on the efficiency of treatment of sulfide in wastewater over samples of wastewater receiving ozone only. Previous studies presented herein demonstrated that certain combinations of ferric chelants and hydrogen peroxide were very effective in reducing the concentration of sulfide within a test sample. However, since it is known that ozone alone will treat sulfide without the aid of selected ferric chelants, tests were conducted using four ferric chelants which have demonstrated varying degrees of effectiveness for improving the oxidation of sulfides in the presence of hydrogen peroxide.

The four ferric chelants chosen for the study were as follows:
HEIDA (N-2(2-hydroxyethyliminodiacetic acid)
EDTA (ethylenediaminetetracetic acid)
NTA (nitrilotriacetic acid)
Gluconic acid Chelants 1 through 3 represent the class of chelants known as the aminopolycarboxylates and gluconic acid is sugar acid (aldonic acid).

It is hypothesized that those samples receiving ferric chelants will react with some amount of the ozone to produce hydroxyl radicals. It is further hypothesized that one, two and, possibly, three hydroxyl radicals can be produced from a single ozone molecule. The production of hydroxyl radicals in excess will improve the efficiency of treatment. The following reactions are pertinent to this study:

Ozone alone with sulfide:

$$S^= + 3O_3 \rightarrow SO_3^= + 3O_2 \quad \text{(Equation 2)}$$

Theoretical hydroxyl radical formation from ozone and ferric chelates:

$$\text{Chelate} + O_3 \rightarrow 3O^- + 3H^+ \rightarrow >3OH^· \quad \text{(Equation 3)}$$

Other variations could involve the formation of single hydroxyl radicals and elemental oxygen or two hydroxyl radicals and a hydroxide ion or water molecule.

Hydroxyl radicals in a reaction with sulfide:

$$S^= + 2OH^· \rightarrow S(\text{elemental sulfur}) \quad \text{(Equation 4)}$$

Proof of this reaction to elemental sulfur was not done using test equipment, however, a heavy yellow precipitate was formed when ferric gluconate was added along with hydrogen peroxide into a solution containing over 1000 ppm of sulfide in a separate experiment. The yellow precipitate was indicative of the presence of elemental sulfur.

Formulations of the various ferric chelants was accomplished by adding 35% ferric chloride to 1.0 Molar solutions of each chelant. Solutions of HEIDA (samples from The Dow Chemical Company of Midland, Mich.), EDTA and NTA (both from BASF Corporation of Florham Park, N.J.), which have a high initial pH, were made by adding the appropriate amount of ferric chloride to the chelants to achieve saturation of available sites on the molecules. Since each of these three chelants had a starting pH of 11, 35% ferric chloride was added until a pH of 4 was attained. The pH was then raised to 7 using sodium hydroxide. Precipitation of iron oxides and/or hydroxides at this pH offered assurance of complete chelation of still soluble iron after 24 hours. A solution of gluconic acid was made by adding sodium hydroxide to 0.3 M solutions until a pH of 11 was attained. The pH was then lowered to 4 using 35% ferric chloride and returned to pH 7 with sodium hydroxide to assure saturation of all chelation sites with ferric ions (Fe oxide precipitate noted after 24 hours).

Total sulfides were tested for using Standard Methods 4500-$S^{2-}$ D with a Hach Chemical Company DR 2000 Spectrophotometer and reagents from Hach specific for this particular test. In order to keep total sulfides within the range of the test, samples were diluted with distilled water prior to conducting the test as per Hach instructions.

A batch of raw influent wastewater from a local wastewater plant was spiked with sulfide to attain a final total sulfide concentration of 13.7 ppm within seven liters of sample in a glass container. The raw wastewater received a dose of 4 ppm of each of the four ferric chelants (mass calculated as chelant) just prior to addition of ozone.

Ozone addition was accomplished using an ozone generator from Ozone Solutions, Sioux Center, Iowa. The generator was capable of generating up to 2 grams per hour of ozone. Injection of ozone into the wastewater was accomplished using an injection system from Ozone Solutions called the H2O-Mini. The unit is designed to treat from 1.5 to 5.7 liters per minute of wastewater. The unit was set up to deliver 6.7 mg/minute of dissolved ozone (assumed the 80% efficiency of dissolution noted by the manufacturer) to wastewater passing the injection nozzle within the H2O-mini. Each test was designed for maximum wastewater flow through the H2O-mini (5.7 liters/min). This meant that the entire 7 liter wastewater volume would pass through the unit every 1.23 minutes with each liter receiving ~0.95 mg of ozone during that time. Using this logic it was determined that it would take~14.4 minutes for the H2O-mini to deliver 13.7 mg/liter of ozone to each vessel or one weight equivalent to the sulfide present in the wastewater.

The literature suggests that it takes ~3 milligram of ozone to oxidize 1 milligram of sulfide (www.o3water.com/Articles/guideto.htm). An objective of the study will be to treat most, but not all, of the sulfide present within the individual test samples in order to determine which treatment was more efficient than the others. Therefore, each test was designed to run for 14.4 minutes through the ozone injection equipment to obtain approximately one third of the ozone necessary to oxidize all sulfide present within the samples if the ozone is applied alone.

In the ozone experiment that did not include ferric chelants, the wastewater was simply pumped through the ozone injection system for the prescribed period of time. Samples were taken over twenty minutes of contact time from the recirculation vessel after ozonation. For each of the four ferric chelant studies, chelants were added to the wastewater recirculation vessels just prior to starting the injection of ozone and recirculation of the liquids. The injection of ozone was applied over the prescribed period and sampled as before in the ozone only experiment.

The tests resulted in the following tabulated data:

TABLE 23

Comparative Data for the Study

| Contact Time (Minutes) | Ozone only | Fe-Gluconate | Fe-NTA | Fe-EDTA | Fe-HEIDA |
|---|---|---|---|---|---|
| 0 | 13.70 | 13.70 | 13.70 | 13.70 | 13.70 |
| 5 | 8.05 | 3.40 | 3.40 | 6.20 | 6.80 |
| 10 | 7.50 | 2.80 | 1.90 | 5.10 | 6.00 |
| 20 | 7.40 | 1.40 | 1.30 | 4.90 | 5.40 |

*Ozone at ~13.4 ppm with sulfide at 13.7 ppm for all studies.

TABLE 24

Overall total percentage of sulfide reduction by test

| Treatment | Ozone only | Fe-Gluconate | Fe-NTA | Fe-EDTA | Fe-HEIDA |
|---|---|---|---|---|---|
| Percentage Reduction | 46% | 90% | 91% | 64% | 60% |

From these studies it can be concluded that:
1. All studies using ferric chelants indicated improved performance over ozone treatment alone.
2. Ferric gluconate (90% reduction) and ferric NTA (91% reduction) were significantly better in treating sulfides in the presence of ozone than ferric EDTA (64% reduction) and ferric HEIDA (60% reduction).

Additional potential methods, systems, and/or equipment configurations are shown in FIGS. 6 and 7, using nitrate as an exemplary oxidizing agent:

Part 3: Hydrogen Sulfide Discussion

Physical-Chemical Properties of Hydrogen Sulfide

Hydrogen sulfide ($H_2S$) can occur in many ground waters. Its presence in such waters is not necessarily due to breakdown of organic matter. Its presence can be due to the bacterial reduction of sulfate. That is, certain bacteria can be able to split oxygen from the sulfate ion, $SO_4^=$, a common constituent of natural waters, and use it to oxidize organic matter. The sulfur then can be left in the form of the sulfide ion, $S^=$, which immediately can change by reaction with water to a mixture of $H_2S$ and $HS^-$ (read H S ion).

$H_2S$ typically presents as a gas slightly heavier than air. At atmospheric pressure, it condenses to a liquid only at the low temperature of approximately −62° C. It is fairly soluble in water. For example, at approximately 20 C, it can dissolve in pure water to the extent of approximately 3850 milligrams per liter (mg/l), or approximately 2.7 liters of $H_2S$ gas per liter of water. The solubility decreases approximately 2.5% for each degree C. increase of temperature. The stated solubility is the amount that will dissolve when the pure gas is brought into contact with pure water. From $H_2S$ diluted with air, it will dissolve only in proportion to its concentration in the gas mixture. Thus, for example, at atmospheric pressure, air in which the concentration of $H_2S$ is approximately 0.1% (1000 parts per million, i.e., ppm) by volume of $H_2S$ will, if brought to equilibrium with pure water at approximately 20 C, produce a solution containing approximately 3.85 mg/l. Stated differently, water containing approximately 3.85 mg/l of $H_2S$ can produce a concentration of approximately 0.1%, or approximately 1000 ppm, in air brought into contact with it. Approximately one mg/l in solution can produce a concentration of approximately 260 ppm by volume in the air if the temperature is approximately 20 C, or approximately 330 ppm by volume if the temperature is approximately 30 C.

When dissolved in water, hydrogen sulfide can be partially ionized, so that it can exist as a mixture of $H_2S$ and $HS^-$. The proportions can depend principally upon the pH of the solution. In typical natural water at a temperature of approximately 20 C, and at approximately pH 7.0, the hydrogen sulfide can b approximately 50% ionized; that is, approximately half of it can be present as $HS^-$ and approximately half as un-ionized $H_2S$. Table 6 shows the approximate proportions ionized at other pH levels. Temperature and mineral content of the water can affect the degree of ionization, but typically only by a small amount. The sulfide ion, $S^=$, also can exist in water, but typically not in appreciable amounts except in solutions in which the pH is above approximately 12. The solubility data given in the previous paragraph generally applies only to the equilibrium between the gas and the slightly acidic (low-pH) solution produced when it dissolves in pure water or between the gas and the unionized $H_2S$ in waters where the pH is not low.

TABLE 1

Approximate Proportions of $H_2S$ and $HS^-$ in Dissolved Sulfide

| pH | Proportion of un-ionized $H_2S$ | Proportion of $HS^-$ |
|---|---|---|
| 5.0 | 0.99 | 0.01 |
| 6.0 | 0.91 | 0.09 |
| 6.2 | 0.86 | 0.14 |
| 6.4 | 0.80 | 0.20 |
| 6.6 | 0.72 | 0.28 |
| 6.8 | 0.61 | 0.39 |
| 7.0 | 0.50 | 0.50 |
| 7.2 | 0.39 | 0.61 |
| 7.4 | 0.28 | 0.72 |
| 7.6 | 0.20 | 0.80 |
| 7.8 | 0.14 | 0.86 |
| 8.0 | 0.09 | 0.91 |
| 8.2 | 0.059 | 0.941 |
| 8.4 | 0.039 | 0.961 |
| 8.6 | 0.025 | 0.975 |
| 8.8 | 0.016 | 0.986 |
| 9.0 | 0.010 | 0.99 |

Toxicity of $H_2S$

Nearly everyone is familiar with the rotten egg odor of $H_2S$ in its natural occurrences. Because of this familiarity there has been a general lack of appreciation of its toxic character, and many deaths have resulted from carelessness in dealing with it. The threshold odor concentration of $H_2S$ is very low; between approximately 1 and approximately 10 mg/l. It is potentially very dangerous because its smell is quickly lost as the concentration increases. In oil refineries, tanneries, viscose plants, and many other chemical industries, workers have occasionally been exposed to $H_2S$ in concentrations that have resulted in death, and there have been many deaths in sewers on this account. Even the $H_2S$ from swamps and from natural hot springs can be deadly. Several lives have been lost as a result of bathing in hot sulfurous spring waters in closed rooms. There is evidence that a concentration of approximately 0.03% (300 parts per million) of $H_2S$ in the air has caused death. It should be noted that this is the concentration that could arise from water containing approximately 1 mg/l of unionized $H_2S$.

Other Forms of Sulfide in Waste Waters

Up to this point the discussion has been about hydrogen sulfide and its ionized form, HS. Sulfur can combine with metals too, producing compounds which are generally insoluble, such as zinc sulfide, ZnS, two copper sulfides, CuS and $Cu_2S$, several iron sulfides, etc. In all such combinations, as well as in $H_2S$ and $HS^-$, sulfur is in an electronegative state. In this state it is simply called sulfide.

In wastewaters of normal pH values (approximately 6.5 to 8) and/or and/or circumneutral pH values, sulfide can be present partly in solution as a mixture of $H_2S$ and $HS^-$, and partly as insoluble metallic sulfides carried along as part of the suspended solids. In analyses of wastewaters, a distinction typically is made between dissolved sulfide and insoluble sulfide. The sum of these forms typically is called total sulfide. The concentrations normally are expressed in terms of the sulfur content. The amount of insoluble metallic sulfide ordinarily does not exceed approximately 0.2 to 0.3 mg/l if the sewage is of residential origin, but the amount can be larger in sewers containing trade wastes.

Sulfide in wastewaters can react with dissolved oxygen, mostly by biological processes. Under the conditions prevailing in most sewers, the principal biological oxidation product is thiosulfate. If oxidizing bacteria are abundant in the wastewater, and dissolved oxygen is also present, sulfide can be oxidized at a rate of approximately 1 mg/l in approximately five minutes, but in less active sewage, as for example fresh domestic sewage, the same reaction can take approximately one hour. Sulfide also can react chemically with dissolved oxygen, that is, without the intervention of bacteria. This reaction typically is slow, producing a variety of products, including sulfur, thiosulfate, sulfite, sulfate, and others. The rate of reaction can depend greatly on the presence of catalysts such as iron ions and the products produced can be influenced by the pH value.

$H_2S$ that escapes as a gas from solution in a sewer can be oxidized on exposed surfaces. If the surfaces are quite dry, free sulfur can be formed, but under moist conditions a species of bacteria named *Thiobacillus concretivorus* can oxidize it to sulfuric acid (which can cause corrosive damage to vulnerable materials) by the reaction:

$$H_2S+2O_2=H_2SO_4$$

The process of oxidation of hydrogen sulfide can be a complex series of reactions involving many members of the species *Thiobacilli*, each with its own optimum growth rate at a given pH value. Some of the *Thiobacilli* can remain active in solutions containing up to approximately 7% of $H_2SO_4$ (pH approximately 0.2). The whole process of oxidation of hydrogen sulfide by bacteria and the factors which influence the bacterial corrosion of concrete in water can be complex.

The Occurrence of Sulfide in Sewage

Sewage can contain bacteria, sulfate, and/or organic matter, so it can have the elements required for sulfide generation. One further condition can be necessary. The reduction of sulfate to sulfide typically can occur only under anaerobic conditions. In the absence of dissolved oxygen, nitrate can provide oxygen for bacteria and can thus prevent septic conditions from developing. When all the "oxygen" provided by the nitrate anions has been consumed by the facultative anaerobic bacteria, the conditions can become strictly anaerobic. This is a state that can develop in sewage, because many kinds of bacteria can be present that can rapidly consume dissolved oxygen and "oxygen" from nitrate. However, if the sewer is partly filled, the water surface exposed to the air can absorb oxygen. The rate of absorption typically is slow, and the bacterial action can deplete it to concentrations of approximately a few tenths of a mg/l, or sometimes only approximately a few hundredths. Still, where any dissolved oxygen or nitrate at all is present there might be no reduction of sulfate.

A layer of slime often builds up on the submerged pipe wall in a sewer, very thin where the stream is swift, but a millimeter or more in thickness where it is slow. The slime layer can be the site of intense micro-biological action, and it is here that anaerobic conditions can develop, and that the most active sulfate reduction and/or sulfide generation can take place.

There is frequently an aerobic (oxygen containing) zone in the slime layer where it is in contact with the flowing stream. In a typical case, the aerobic zone can extend into the slime layer to a depth of only approximately 0.1 mm, but it can extend considerably deeper if the stream carries several mg/l of dissolved oxygen. Sulfate and part of the organic nutrients can diffuse through the aerobic zone and into the deeper layers, thus supplying the requirements of bacteria that produce sulfide. Thus, sulfide generation can occur even when the stream contains dissolved oxygen, but is unlikely to occur if nitrate were present, as nitrate will likely diffuse into the lower layers of the slime and provide a source of oxygen to prevent septicity. The zone where sulfide is produced is generally only approximately a few tenths of a millimeter in thickness. The sulfate and/or the organic nutrients can be used up in that distance and unless the slime layer is quite thin, there can be a deeper layer that is relatively inactive.

Sulfide diffusing out of the zone where it is produced can be, at least in part, oxidized to thiosulfate in the aerobic zone. If much oxygen is present, all of the sulfide can be oxidized there, but if the oxygen condition is low, then part of the sulfide can escape from the slime layer into the stream. When this condition prevails, the sewer can show "sulfide build-up", meaning that the concentration in the stream can progressively increase as the sewage moves down the pipeline. However, oxidation can occur to some extent in the stream, and some $H_2S$ can escape to the atmosphere, so the concentration can tend to approach a steady state condition where the losses are equal to the rate that sulfide is produced.

Figure 3:
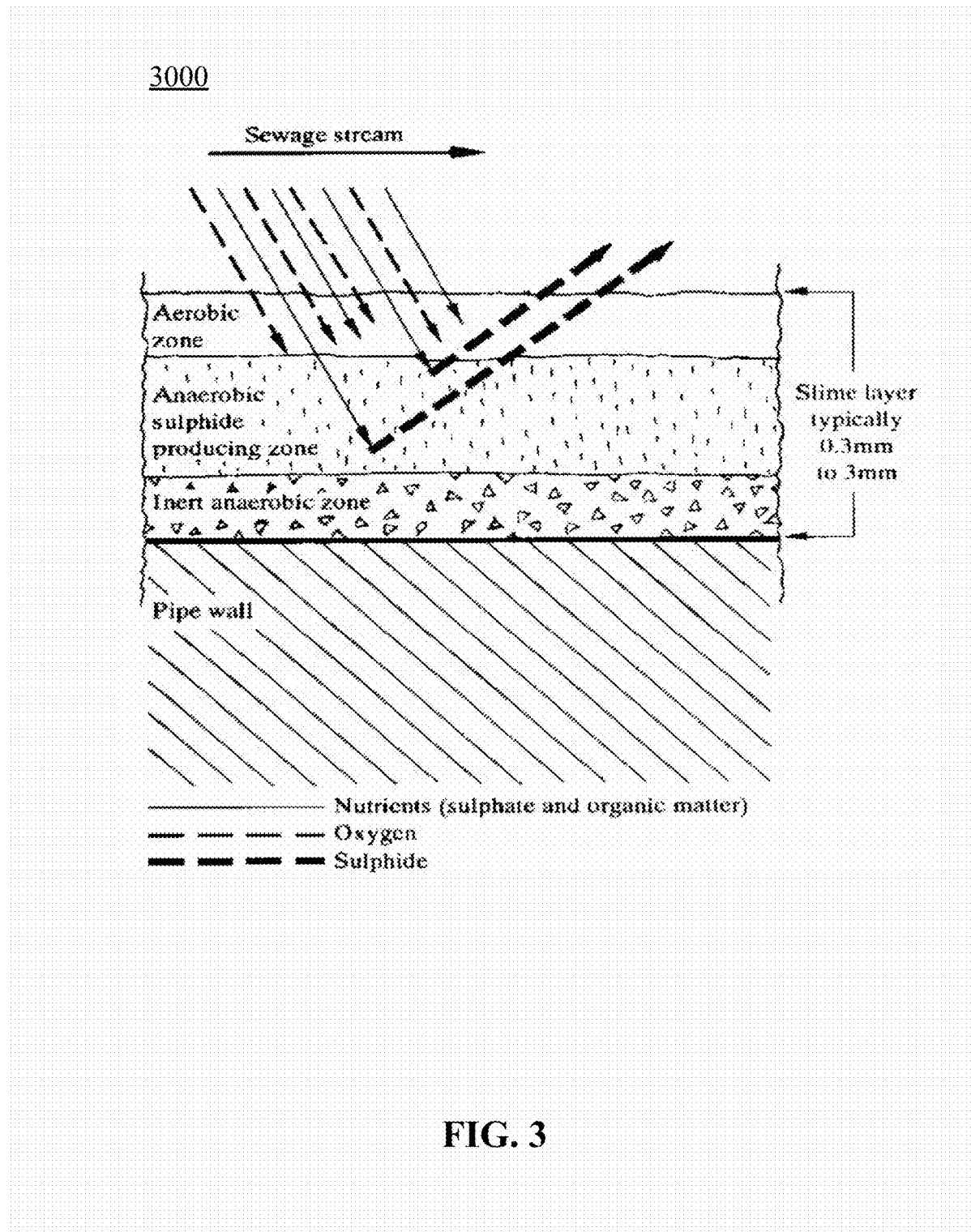
FIG. 3 is a block diagram of an exemplary embodiment of a system 3000.

FIG. 3 shows a cross-sectional view of the slime layer of a sewer, pictured on a magnified scale. Oxygen, organic nutrients, and sulfate are seen to be diffusing into the slime layer. Oxygen and part of the organic nutrients can be used up in the aerobic zone. Sulfate and the remainder of the organic nutrients can diffuse farther, reaching the anaerobic zone. A dense population of anaerobic bacteria can be found there, especially the species *Desulfovibrio desulfuricans*, which can bring about the reaction that produces sulfide, at a rate determined by the rate that the nutrients can diffuse into that zone. Sulfide can diffuse outward from the slime layer, part of it being oxidized in the aerobic zone and/or part escaping into the stream.

The concentration of oxygen necessary to prevent any sulfide build-up can vary widely, depending upon a number of conditions. The velocity of the stream can one factor. At low velocity, the motion of the water is not necessarily very efficient in carrying oxygen to the slime layer, and under these conditions a higher oxygen concentration can be necessary if sulfide is to be barred from the stream compared to when the stream is swift. In a typical case, approximately 0.5 mg/l of dissolved oxygen might be needed to prevent sulfide build-up, but under some conditions as much as approximately 1.0 mg/l, or even more, might be required.

A characteristic of the generation of sulfide in sewers can be its sporadic occurrence. In the early decades of this century, this seemingly random appearance of sulfide in sewers was the subject of much speculation. Now that the mechanism of sulfide build-up is better understood, the potential reasons are clearer. A major determining factor in sulfide build-up can be the amount of oxygen (dissolved and/or available from nitrate) in the sewage stream. If the oxygen concentration is high, there likely will be no sulfide build-up; if it is low, then sulfide build-up reasonably might be expected.

The rate of sulfide production can be influenced not only by oxygen concentration, but by other factors as well. The rate can increase with increase of temperature, and it can depend in a complex way on the concentrations of organic nutrients and of sulfate. The rate of sulfide production can be limited by a scarcity of either sulfate or organic matter. Since both can be consumed in the biological reactions that produce sulfide, they can be required in a certain ratio. If there is an excess of organic nutrients, then the rate of sulfide production can be limited by the amount of sulfate and if there is an excess of sulfate, the rate can be limited by the amount of organic nutrients.

The organic nutrients available for sulfide production in sewers have not been identified, but they likely are in solution, since they tend to diffuse to the sulfide producing zone. It has been assumed that in typical municipal sewage the organic nutrients for sulfide generation are proportional to the biochemical oxygen demand or BOD and/or to the chemical oxygen demand or COD.

The effects of velocity on sulfide build-up can be complex. At low velocity, solids can settle and/or move slowly and/or intermittently along the bottom. The loosely deposited solids quickly can become depleted of oxygen, and sulfide generation can proceed until the depletion of sulfate and/or organic nutrients. If the solids are then disturbed by the motion of the water, sulfide can be released into the stream in greater amount than would result from the process. Higher velocities can prevent this from happening, and also can increase oxygen absorption into the stream, increase the rate of oxygen transfer to the slime layer, and/or shorten the time that the sewage spends in transit, any of which can lead to lower sulfide concentrations. On the other hand, at low velocities, and especially if the sewage is intermittently stationary, as is usually the case in pressure mains from pumping stations, nutrients can become depleted in the water adjacent to the slime layer, thus retarding sulfide generation. An increase of velocity in a completely filled pipe can, up to a point, increase sulfide generation.

An equation could be written that would express the rate of sulfide build-up as a function of the various factors that influence generation by the slime layer and the losses by oxidation and escape to the air. Such an equation likely would not be very useful, because of the difficulty of securing the input information that would be required. An important value might be the dissolved oxygen concentration. An accurate prediction of dissolved oxygen could require a detailed history of the sewage for an hour or so upstream from a point where a prediction of sulfide build-up would be attempted. Absorption of oxygen at the surface of the stream can be predicted if slope, pipe size, and flow quantity are known, but extra oxygen can be added at junctions, drops, and/or other points of turbulence, and it can be difficult to predict the rate at which oxygen will be consumed.

Perhaps the only practical approach to the problem of predictions is to limit such attempts to the restricted case that the unpredictable factors are favorable for build-up. That is to say, it can be assumed that sufficient sulfate is present so that it is not limiting, that oxygen concentration is low, that no nitrate is present either derived from the water supply or from industrial discharges, and that there is no toxic condition or other factor that inhibits the action of the slime layer.

To predict sulfide build-up, it is recognized that quantitative forecasts might be possible for the restricted case of sewage in pressure mains and other completely filled pipes, where the sewage is denied any contact with air. Sewage pumped into a pressure main often contains dissolved oxygen which can result from its fall into the wet well and/or from other causes, and on this account there might be no sulfide build-up initially, but after a time the dissolved oxygen and nitrate "oxygen" can be completely depleted and then the maximum sulfide producing capability of the slime layer can be displayed.

When the sewage becomes completely anaerobic, sulfide generation can occur not only at the pipe wall but also in the stream. The amount produced in the stream, however, can be small in comparison with the output by the slime layer except in very large pipes.

In a small pipe of, say, approximately 100 mm diameter, troublesome sulfide concentrations can arise even where the retention time of the sewage in the main is as little as approximately ten minutes. In larger mains the build-up rate can be slower, but significant amounts can be produced within approximately 20 to approximately 30 minutes in a pipe of approximately one meter diameter.

The presence of considerable amounts of H2S in various industrial sour gas streams can be a substantial environmental problem. Various processes are known that relate to the removal of H2S from the sour gases. The important processes for removing H2S gas from sour gases are called the liquid redox processes. In these processes the S2-ion of H2S is oxidized to elemental sulfur in aqueous solution and a redox catalyst is reduced. One of the first processes operating according to this principle was the Stretford process, in which vanadium catalysts were used. Since this process has problems with respect to environmental aspects, it is increasingly being replaced by processes in which a redox catalyst based on other metals is used. In most of these processes, iron can be used as the metal. In this case a soluble iron(III) chelate complex can act as redox partner that, when the S2-ion can be oxidized to elemental sulfur, itself can be reduced to an iron(II) chelate complex. The iron complex-containing scrubbing solution can be treated with atmospheric oxygen gas, the iron(II) being oxidized back to iron(III) and the scrubbing solution being able to be recirculated. In this process, it can be important that the concentration of the iron chelate complex in the solution is sufficiently high to achieve efficient conversion rates. In addition, a precipitation of iron salts can be undesirable in any phase of the process. Therefore, the iron ion can be kept in solution in complexed form. Usually, for this purpose, aminocarboxylate compounds are used, such as nitrilotriacetic acid (NTA), ethyl enediaminetetraacetic acid (EDTA), and/or hydroxyethylenediaminetriacetic acid (HEDTA). These complexes have the disadvantage that they are partially decomposed during the regeneration (see U.S. Pat. No. 6,998,099, which is incorporated herein by reference in relevant parts and in its entirety).

It has now been discovered that the addition of nitrate, via an aqueous sodium nitrate solution, to sewage systems, waste treatment plants, and/or other industrial waste applications containing dissolved hydrogen sulfide, can result in the elimination and/or substantial reduction of the hydrogen sulfide, and/or the elimination of other "minor" odors associated with other sulphur-containing compounds.

Although not intended to be limiting, it is currently believed that the addition of nitrate can provide an oxygen source that promotes the growth of naturally occurring bacteria, which can utilize in their metabolism the sulfur tied up as hydrogen sulfide. It has been demonstrated, both in lab jar tests and in an actual sewage collection system test, that dosing sewage containing over approximately 50 mg/L of dissolved hydrogen sulfide with a sodium nitrate solution can reduce the dissolved hydrogen sulfide to less than approximately 0.1 mg/L. Along with this phenomena, a significant reduction in sewage biological oxygen demand, BOD, of up to approximately 70%, and overall "sweetening", i.e., removal of other minor odors, of the sewage has been observed. These phenomena might be the results of the biological process promoted by the nitrate addition.

Because the necessary reaction is currently believed to be biochemical, it typically will not occur within a sterile solution, i.e., naturally occurring bacteria typically must be present. Moreover, the removal of hydrogen sulfide typically is not instantaneous. According to applicant's tests, an "incubation" period can be used to culture the bacteria. That incubation period can range from approximately 8 to approximately 96 hours, including every value and subrange there-between, such as approximately 24 to approximately 48 hours. An additional period can be used for sulfide removal, that period ranging from approximately 1.5 to approximately 20 hours, including every value and subrange there-between, such as approximately 3 to approximately 12 hours.

Nitrate and nitrite can be strong oxidizing agents. Therefore, it is suspected that both nitrate and nitrite can pull electrons away from susceptible reduced compounds such as a chelated ferrous iron molecule. In removing an electron from a ferrous ion a resulting ferric ion can be created. Ferric iron can react with sulfide ions in a reaction that sequesters an electron from the sulfide ion. In wastewater treatment, ferric salts can be used to sequester sulfide in solution, thus rendering the sulfide unavailable to create hydrogen sulfide gas.

Regeneration of ferric chelates within an anaerobic waste treatment system can be practically done with oxygen in most cases. Injected and/or diffused oxygen can have the ability to oxidize (regenerate) the ferrous chelates to ferric chelate under anaerobic conditions while providing an added benefit in providing oxygen to the wastewater for promoting aerobic digestion and/or to prevent the formation of sulfide within an otherwise anaerobic environment. Regenerated ferric chelate can take electrons from the sulfide molecules present, thus oxidizing it to elemental sulfur at the circumneutral pH (approximately 6.0 to approximately 8.5) that can be necessary for the reaction.

Figure 4:
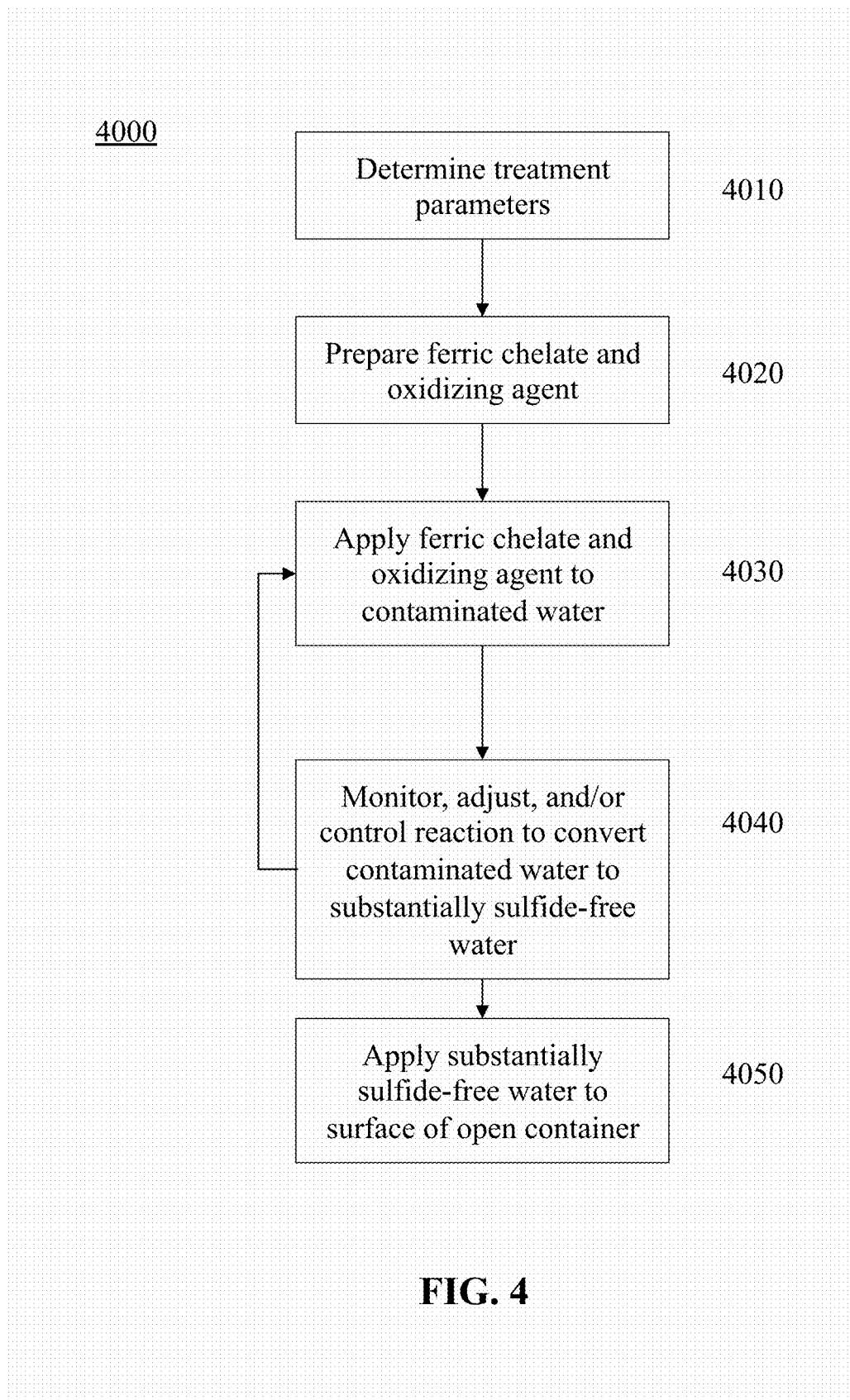
FIG. 4 is a flowchart of an exemplary embodiment of a method 4000.

An exemplary embodiment of the above-described process is shown in FIG. 4. In activity 4100, chemicals, such as a liquid ferric chelate solution, an oxidizing agent, and/or a liquid oxygen solution can be added to a waste collection system. At activity 4200, the ferric chelate can quickly react to oxidize sulfide. At activity 4300, the ferrous chelate that is generated in sulfide oxidation can then react with oxygen from the oxidizing agent and/or oxygen solution to regenerate ferric chelate for further sulfide oxidation. At activity 4400, any remaining ferric chelate solution and/or oxygen can prevent formation of additional sulfide. At activity 4500, the treated waste can exit the collection system.

Pure oxygen can purchased in liquid form for application to a treatment system from a number of commercial suppliers, such as Air Liquide (Holland, Ohio), Praxair (Loveland, Colo.), and/or Air Products (Conyers, Ga.).

At standard temperature and pressure, oxygen is a colorless, odorless gas with the molecular formula O2, in which the two oxygen atoms are chemically bonded to each other with a spin triplet electron configuration. This bond has a bond order of two, and is often simplified in description as a double bond or as a combination of one two-electron bond and two three-electron bonds.

Triplet oxygen is the ground state of the O2 molecule. The electron configuration of the molecule has two unpaired electrons occupying two degenerate molecular orbitals. These orbitals are classified as antibonding (weakening the bond order from three to two), so the diatomic oxygen bond is weaker than the diatomic nitrogen triple bond in which all bonding molecular orbitals are filled, but some antibonding orbitals are not.

Part 4: Example Set B

Example 1: Treatment of Sulfide within a 14.7 Mile Force Main—Background

A nominal 20-inch diameter concrete force main from West County Wastewater Treatment Plant (WCWWTP) in Jefferson county, Kentucky, carries waste biosolids (~1%) to Morris Forman Wastewater Treatment Plant (MFWWTP) for further processing. The force main is ~14.7 miles in length and contains ~1.3 million gallons of biosolids at full capacity. The pump capacity for moving the biosolids from the WCW plant is rated at 1950 gpm or ~117,000 gph. At this pump rate, a complete flushing of the line would take 11.11 hours of continuous run-time. However, continuous transmission of biosolids is not done since the WCW plant typically generates ~600,000 gallons of waste biosolids per day.

Daily run times for biosolids transmission ranges from 5-12 hours per day with a typical run time of ~5.5 hours per day. Depending on the run times, biosolids retention times can range from 24 hours up to 96 hours but, more typically, are within the force main for ~48 hours. The biosolids empty into an aerated solids receiving tank (SRT) at Morris Forman. The biosolids are pumped from the SRT to either the anaerobic digesters or to the headworks of the Morris Forman plant when bypassing of the SRT is required.

Because the retention time is normally at least 48 hours, high concentrations of sulfide are generated under the anaerobic conditions within the force main. This situation is further exacerbated by the high oxygen demand of the waste biosolids being transmitted.

The resulting hydrogen sulfide generation within the atmosphere of the aerated SRT receiving this waste often exceeds concentrations above 700 ppm with average of 400-500 ppm. Total sulfide within the biosolids often exceeds 15 ppm.

The headspace air from the SRT, in addition to air from a biosolids decanting process and centrifugation room are pulled through two bio-scrubbers designed to scrub the air of hydrogen sulfide and associated odorous organic compounds. Under normal loading the bio-scrubbers do an adequate job of achieving <0.5 ppm hydrogen sulfide. However, during the daily force main biosolids transmission cycles from the WCW plant, spikes of hydrogen sulfide create a situation that overloads the bio-scrubbers. This results in hydrogen sulfide and associated organic odors escaping the scrubbers above the recognized limits for threshold odor detection. Untreated odorous gases from the bio-scrubbers combined with other fugitive emissions from the clarifiers, headworks, and solids handling is primarily responsible for the offensive odor that escapes the plant grounds to generate odor complaints from the surrounding neighborhoods.

In addition to the significant odor issues associated with the biosolids transmission from WCW plant, hydrogen sulfide related corrosion within the concrete transmission line is of concern. Failures are common-place and sections of piping have to be replaced regularly. The transmission line contains numerous gas vents (pressure relief valves) designed to vent gas pressure as it builds within the line. Failure of the pressure relief valves consistently allows oxygen into the line. As oxygen enters the line, bacteria, primarily *Bacillus concretivous*, create sulfuric acid as they proliferate in the vicinity of the oxygen source. The resulting sulfuric acid formation degrades the concrete piping, resulting in numerous collapses within the line over the years. Introduction of oxygen into the force main at these locations resulted in a critical discovery for the use of VTX (Fe-MGDA) for treating force mains.

Brief Assessment of Process Findings

The Endurox (combination of Fe-MGDA and nitrate) Process combines three treatment strategies that can control sulfide and/or sulfide generation within wastewater transmission force mains. The process can utilize an organic catalyst (Fe-MGDA) that can react with hydrogen peroxide to form hydroxyl/free radicals. Hydroxyl/free radicals can be potent oxidizers that appear to suppress the population of sulfide forming bacteria that can exist naturally within wastewater. Sulfide that actually does form down-line within a force main can be oxidized by a reaction involving the catalyst and a mild oxidant (nitrate) within the Endurox product. This reaction can be viable for lengthy periods of time within force mains but is not necessarily effective beyond 12 hours of anaerobic conditions at the dosages prescribed. The active life of this particular part of the process can be based on the dose rate of the Endurox additive. Finally, nitrate can be utilized preferentially by sulfide producing bacteria prior to the consumption of sulfate/sulfite as an oxygen source by those organisms. Because this substance can be used preferentially, sulfide production does not necessarily proceed until it is depleted. However, under the conditions of the West County Force Main study, all nitrate and hydrogen peroxide seemed to be exhausted after 12 hours of contact. While the combination of these treatment strategies appears to have resulted in unprecedented success in the treatment of sulfide within force mains, the conditions in West County Force Main was well beyond it's designed capability. However, the pilot study was successful leading the investigator to surmise that oxygen entering the line through faulty air relief valves could have been a factor.

Oxygen being introduced through faulty air relief valves of the West County Force Main might have been oxidizing ferrous MGDA to ferric MGDA. Ferric MGDA can react with sulfide to extract an electron (i.e., oxidize sulfide to elemental sulfur) and/or reduce ferric MGDA to ferrous MGDA. Additional oxygen could continue to re-oxidize the ferrous MGDA to ferric MGDA and the process could continue to cycle in this manner until the oxygen from the relief valves was depleted.

West County Force Main Pilot Study

Summary of Pilot Study Test Conditions

Several treatment scenarios were conducted to determine a cost effective treatment approach for reducing sulfide. Dosages of Endurox (0.05 M Fe-MGDA and 4.2 M nitrate)

and 50% hydrogen peroxide were applied into the waste biosolids leaving the WCW plant within the force main. Injections of treatment agents were metered into a water line using Walchem and Pulsafeeder diaphragm metering pumps. The water line containing the treatment agents was directed into the biosolids transmission line through a small valve placed on the side of the transmission line as it left WCW plant. For pilot testing after week one, the metering pumps were electronically paced with the biosolids transmission pump so as to begin feeding when the biosolids pump cut on and stop feeding when it was turned off. Before this situation was available to the investigator, the metering pumps were cut on with timers that roughly met the schedule for pumping of biosolids.

Testing for the effect of the process on sulfide control was conducted at the influent to the Solids Retention Basin (SRT) and in the air space above the SRT at the Morris Forman Wastewater Plant.

Alteration of the BioSolids Retention Time

Run times and retention times typically must be clearly understood during treatment events in order to properly design dosage requirements. A typical biosolids transmission might runs for 6 hours on day one resulting in ~702,000 gallons of biosolids being pumped into the force main. This plug of biosolids could then typically sit within the pipe without moving until the following afternoon when pumping starts again. If the follow-on transmission of biosolids runs for 5 hours on day two, ~585,000 gallons of biosolids will have been pumped. The total now transmitted during the two days of pumping comprises ~1,287,000 gallons of biosolids. Biosolids pumped on day one will not begin to emerge from the system into the SRT until the following day. This material will now have been in the pipe for over 48 hours.

The flow retention time for biosolids was not altered from the existing pumping schedule during week one of pilot testing. Biosolids within the force main during this period of study maintained very long retention times. During the second week of testing, plant personnel at the WCW plant preceded each day's biosolids pumping event with flow from the plant influent. Enough influent water was pumped so as to reduce the retention time of the biosolids to a predictable retention time schedule of ~24-30 hours. Operators at Morris Forman diverted the plug of influent water to the headworks of the plant so as not to introduce sulfide-laden influent into the SRT. The flow was re-diverted to the SRT once biosolids appeared in the bypass water. In this way, the investigator could test the effect of Endurox on biosolids with more predictable retention times within the force main. Since this is a technique that had been utilized by the WCW plant and Morris Forman historically, it was reasoned that it could be re-deployed for future to help minimize treatment cost for the biosolids.

Description and Results from the Endurox Treatment Studies

Endurox Treatment Goals

Goals considered for the Endurox pilot study were as follows:
1. significantly reduce $H_2S$ from the WCW plant force main biosolids at the Morris Forman Sludge Retention Tank;
2. provide corrosion protection to maintain the long-term integrity of the force main;
3. significantly reduce H2S spikes in bio-scrubber influent; and/or
4. successfully prove that sulfide can be economically treated in a transmission line with excessive retention times using the Endurox Process.

Conclusions

The pilot demonstrated that the Endurox Process could be applied to biosolids during a long retention time force main transmission to control odors associated with hydrogen sulfide. However, the extensive retention times within the force main from the West County Plant to the MSD Plant was far beyond the recognized capability of the Endurox Process. In actuality, the investigator expected to have a moderate reduction in sulfide entering the SRT at the MSD Plant. Control at the levels demonstrated strongly suggested that another factor was at play. Further laboratory investigation might confirm that reduction of sulfide through strategic placement of air/oxygen introduction into an anaerobic force main collection system will be a reasonable method for oxidizing ferro chelates from the ferrous state to the ferric state. If a method can be developed to accomplish this then sulfide treatment via oxidation might ensue. Further, continued availability of oxygen can consistently reoxidize ferrous chelate for additional oxidation of sulfide in-line.

Example 2: Anaerobic Sulfide Treatment: Pure Oxygen Versus Pure Oxygen+Ferric MGDA Catalyst Objective A series of studies were conducted to determine the effect of ferric methylglycine diacetate (Fe MGDA) on the rate of treatment of sulfide within sulfide laden anaerobic wastewater when pure oxygen was injected into the test flask. Flasks injected with pure oxygen alone were compared to flasks injected with Fe MGDA and pure oxygen.

Procedure

Figure 8:
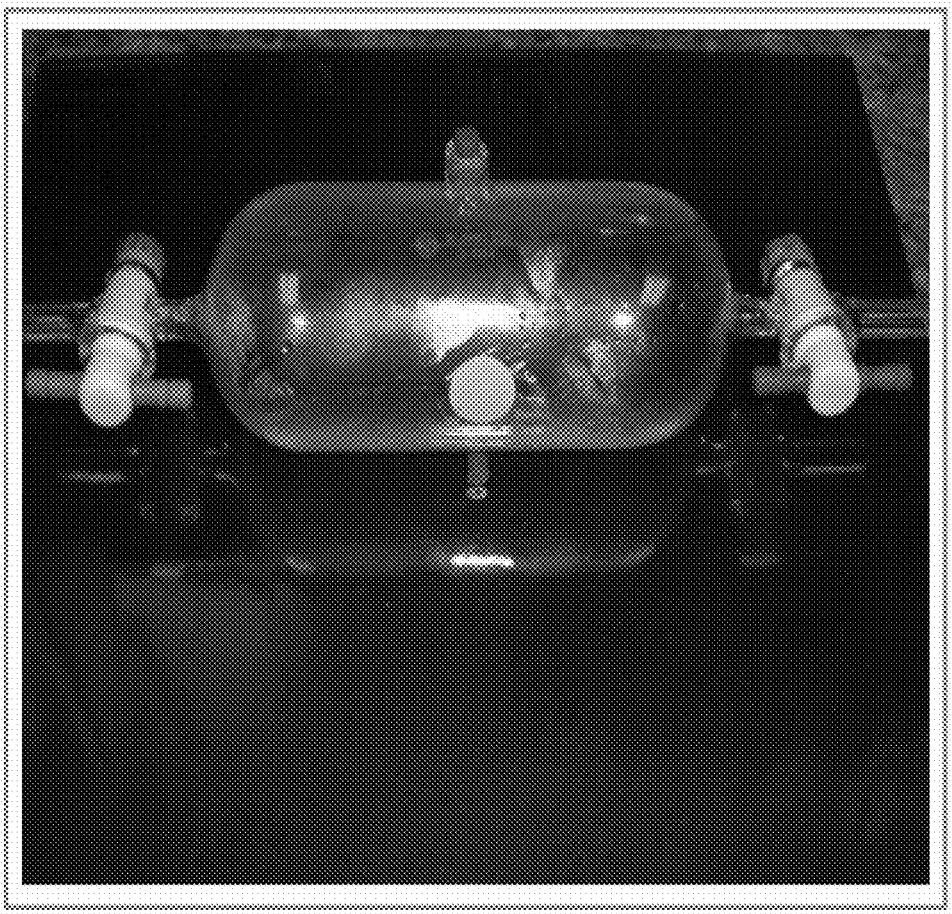
FIG. 8 is a block diagram of an exemplary embodiment of a system 8000.

Three 300 milliliter Supelco test flasks were utilized for conducting the testing. Each flask had two valves and a single port for a septum to inject chemicals into the vessel. FIG. 8 presents a photo of the vessel.

Each test flask was completely filled to zero headspace with wastewater from a municipal wastewater treatment facility that had been spiked with sodium sulfide. The pH of the wastewater was adjusted to neutral (~7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Bottled pure oxygen from Praxair Corporation was used in the study as a source of oxygen. Ten cubic centimeter samples (~14 mg O2) were extracted from the oxygen cylinder in a glass syringe and injected into the 300 milliliter test flask to begin each study (total potential O2/liter~45 mg/l). Oxygen was injected simultaneously with a slight opening of a valve on the cylinder so that wastewater could could be displaced by the incoming volume of oxygen.

For studies conducted with Fe MGDA, oxygen was injected as described followed by injection of ~0.1 milliliters of ~0.03 M Fe MGDA. The control sample flask received no injection of any ingredients.

After injection of ingredients into each test flask, the flasks were placed on a New Brunswick Shaker Table and shaken for variable periods of time at ~200 rpm's. After each test period, flasks were removed and a sample extracted for sulfide testing using a La Motte Sulfide Color Comparison Test Kit. Sample for the control was taken at time zero for each study.

Results

| Trial 1 - Sulfide Reduction: Oxygen only versus Oxygen with Fe-MGDA | | |
|---|---|---|
| Vessel | Time (min) | Sulfide, mg/l |
| Control | 0 | 33 |
| Oxygen only | 5 | 25 |
| Oxygen w FeMGDA | 5 | 10 |

| Trial 2 - Sulfide Reduction: Oxygen only versus Oxygen with Fe-MGDA | | |
|---|---|---|
| Vessel | Time (min) | Sulfide, mg/l |
| Control | 0 | 31 |
| Oxygen only | 5 | 25 |
| Oxygen w Fe-MGDA | 5 | 10 |
| Control | 0 | 31 |
| Oxygen only | 22 | 1.5 |
| Oxygen w Fe-MGDA | 22 | 0.2 |

| Trial 3 - Sulfide Reduction: Fe-MGDA with Oxygen Rate Study | |
|---|---|
| Time | Sulfide Remaining, mg/l |
| 0 | 32 |
| 5 | 13 |
| 10 | 0.5 |
| 12.5 | <0.1 |

Conclusions

The rate of removal of sulfide within previously anaerobic wastewater when pure oxygen is applied with Fe-MGDA catalyst is significantly greater than oxygen alone.

Example 3: Anaerobic Sulfide Treatment: Atmospheric Oxygen Versus Atmospheric Oxygen+Ferric MGDA Catalyst Objective A series of studies were conducted to determine the effect of ferric methylglycine diacetate (Fe MGDA) on the rate of treatment of sulfide within sulfide laden anaerobic wastewater when atmospheric oxygen was injected into the test flask. Flasks injected with atmospheric oxygen alone were compared to flasks injected with Fe MGDA plus atmospheric oxygen.

Procedure

Three 300 milliliter Supelco test flasks were utilized for conducting the testing.

Each flask had two valves and a single port for a septum to inject chemistry into the vessel.

Each test flask was completely filled to zero headspace with wastewater from a municipal wastewater treatment facility that had been spiked with sodium sulfide. The pH of the wastewater was adjusted to neutral (~7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Ten cubic centimeter samples (~3 mg O2) were injected into the 300 milliliter test flask to begin each study (total potential O2/liter~10 mg/l). Air was injected simultaneously with a slight opening of a valve on the cylinder so that wastewater could could be displaced by the incoming volume of air. Fresh air (~5 cc's) entered the vessel between each sampling event to accommodate for removing sample volume to conduct sulfide test.

For studies conducted with Fe MGDA, air was injected as described followed by injection of ~0.1 milliliters of ~0.03 M Fe MGDA. The control sample flask received no injection of any ingredients.

After injection of ingredients into each test flask, the flasks were placed on a New Brunswick Shaker Table and shaken for variable periods of time at ~200 rpm's. After each test period flasks were removed and a sample extracted for sulfide testing using a La Motte Sulfide Color Comparison Test Kit. Sample for the control was taken at time zero for each study.

Results

| Trial 1 - Sulfide Reduction: Air only versus Air with Fe-MGDA | | | |
|---|---|---|---|
| Time (min) | Control | Air Only | Air w Fe-MGDA |
| 0 | 33 | | |
| 5 | — | 30 | 22 |
| 10 | — | 24 | 18 |
| 15 | — | 20 | 11 |
| 20 | — | 18 | 9 |

Conclusions

Air with Fe-MGDA was more efficient for sulfide removal within test liquids than was air alone with the air plus Fe-MGDA treatment removing approximately 73% and the air only removing approximately 45% in 20 minutes of contact.

Example 4: Anaerobic Sulfide Treatment: Pure Oxygen Versus Pure Oxygen+Ferric MGDA Catalyst and Nitrate (Endurox)

Objective

A series of studies were conducted to determine the effect of ferric methylglycine diacetate (Fe MGDA) and nitrate mixture on the rate of treatment of sulfide within sulfide laden anaerobic wastewater when pure oxygen was injected into the test flask. Flasks injected with pure oxygen alone were compared to flasks injected with Fe MGDA/nitrate plus pure oxygen.

Procedure

Three 300 milliliter Supelco test flasks were utilized for conducting the testing. Each flask had two valves and a single port for a septum to inject chemistry into the vessel.

Each test flask was completely filled to zero headspace with wastewater from a municipal wastewater treatment facility that had been spiked with sodium sulfide. The pH of the wastewater was adjusted to neutral (~7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Ten cubic centimeter samples (~14 mg O2) were extracted from the oxygen cylinder in a glass syringe and injected into the 300 milliliter test flask to begin each study (total potential O2/liter~45 mg/l). Oxygen was injected simultaneously with a slight opening of a valve on the cylinder so that wastewater could could be displaced by the incoming volume of oxygen. Fresh air (~5 cc's) entered the vessel between each sampling event to accommodate for removing sample volume to conduct sulfide test.

For studies conducted with Fe MGDA/nitrate, oxygen was injected as described followed by injection of ~0.1 milliliters of ~0.03 M Fe MGDA. Nitrate added within the mixture amounted to ~8.75 mg of nitrate (as NO3). The control sample flask received no injection of any ingredients.

After injection of ingredients into each test flask, the flasks were placed on a New Brunswick Shaker Table and shaken for variable periods of time at ~200 rpm's. After each test period flasks were removed and a sample extracted for sulfide testing using a La Motte Sulfide Color Comparison Test Kit. Sample for the control was taken at time zero for each study.

Results

Trial 1 Sulfide Reduction: Pure Oxygen only versus Pure Oxygen with Fe-MGDA/Nitrate

| Time (min) | Control | O2 Only | O2 w Fe-MGDA/NO3 |
| --- | --- | --- | --- |
| 0 | 33 | | |
| 5 | — | 30 | 20 |
| 10 | — | 16 | 10 |

Conclusions

Reduction in sulfide was not improved over Fe MGDA. In fact, the data suggest that the nitrate addition retarded the overall reaction as compared to Fe MGDA alone additions. However, the Fe MGDA/nitrate mixture reduced sulfide at a great rate than pure oxygen alone at approximately 69% as compared to approximately 50%, respectively, after 10 minutes of contact.

Part 5: Example Set C

Case Study 1

Cursory Test for Determining the Efficacy for Controlling the Volatilization of Hydrogen Sulfide Gas Utilizing a Vapor Suppression Spray System A cursory test was conducted to determine the effectiveness of substantially eliminating hydrogen sulfide vapors from escaping a body of test water containing high levels of hydrogen sulfide using a surface spray applicator combining ferric gluconate in combination with hydrogen peroxide. The test was to confirm that such a process could substantially seal vapors in solution over a lengthy period of time to minimize or totally control escape to the atmosphere.

Materials

Five gallon bucket
Rubber gasket sealing lid in which a centrally located 3" diameter hole was bored
OdaLog L2 Hydrogen Sulfide Gas Logger from Detection Instruments, Phoenix,
Arizona with a detection range of 0-1000 parts per million (ppm)
Acorn 6 pH Meter
5 liters of de-ionized water
Technical grade Sodium Hydrosulfide, anhydrous
3.5% Hydrogen Peroxide
Digital timer
Eppendorf Research Plus 5000 Auto-pipette 0.5-5 mL
Dual chamber spray bottle capable of dispensing 0.5 ml per pump from each chamber.
Solution of 5 mg/ml of hydrogen peroxide diluted to test solution from 3.5% commercially available hydrogen peroxide with distilled water.
A solution of ferric glucontate treatment was prepared using 2.0 M ferric gluconate solution along with distilled water to achieve a final concentration of ferric gluconate at 5 mg/ml, as ferric iron. The chelated iron is the active ingredient within the ferric gluconate that attaches to sulfide as an intermediary for converting sulfide to elemental sulfur.

Method

A five gallon bucket containing five liters of de-ionized water was infused with 10 parts per million of total sulfide using technical grade anhydrous Sodium Hydrosulfide. The pH of the water was then adjusted to a pH of 7.0 using a dilute solution of hydrochloric acid. Once infused, gaseous hydrogen sulfide was allowed to vaporize and escape into the air column above the test water for each test control prior to implementing treatment studies. An OdaLog Hydrogen Sulfide Detector was placed on top of the 3" diameter hole cut into the center of the bucket lid. After 10 minutes time hydrogen sulfide levels were tested in the atmosphere, the bucket lid was removed and the sulfide solution was discarded.

After cleaning the bucket for control testing for each study, five additional liters of de-ionized water was added and the same quantity of sulfide was infused into the fresh water and the pH adjusted to 7.0. A dosage of 5 mls, 3 mls, and 1 ml of 15 mg/ml H2O2 solution was then spray applied to the surface of the water using a spray applicator bottle in successive studies. After 10 minutes time hydrogen sulfide levels were monitored within the atmosphere above the water.

The procedure above was repeated with the exception of the administration of reduced spray volumes of hydrogen peroxide (same concentration) along with ferric gluconate solution containing 5 mg/ml as ferric iron. Although the hydrogen peroxide and ferric gluconate solutions could have been applied by combining the hydrogen peroxide solution with the ferric gluconate solution, administering them separately yet simultaneously, or administering them sequentially, for this experiment they were applied in combination using a dual chambered spray bottle, which was designed to pull two streams of liquid in equal proportions and then combine both streams together within an internal chamber prior to spraying the combined liquids into a discharge spray nozzle, at a dosage of 2 ml hydrogen peroxide plus 2 ml ferric gluconate solution; 1 ml hydrogen peroxide plus 1 ml ferric gluconate; and 0.5 ml hydrogen peroxide plus 0.5 ml ferric gluconate, respectively.

Each test documented hydrogen sulfide in the atmosphere with no treatment added.

Results

TABLE 1

Hydrogen Peroxide Only Treatment

| Dosage of 15 mg/ml $H_2O_2$ (ml) | $H_2S$ reading after 10 minutes (ppm) |
| --- | --- |
| 0 | 18 |
| 5 | 3 |
| 3 | 4 |
| 1 | 6 |

TABLE 2

Hydrogen Peroxide plus Ferric Gluconate Treatment

| Dosage of 15 mg/ml $H_2O_2$ (ml) | Dosage of Ferric Gluconate (ml) | $H_2S$ reading after 10 minutes (ppm) |
| --- | --- | --- |
| 0 | 0 | 20 |
| 2 | 2 | 0 |
| 1 | 1 | 1 |
| 0.5 | 0.5 | 3 |

Conclusions

A reduction in the volatilization of hydrogen sulfide levels was noted using both hydrogen peroxide alone and hydrogen peroxide plus ferric gluconate solution applications as compared to the controls. The use of hydrogen peroxide plus ferric gluconate was noted to be a more effective than hydrogen peroxide alone, even though the dose rates for hydrogen peroxide were substantially reduced for the combination study. In order to determine the overall effectiveness of the treatment approach, additional in-situ testing will be necessary.

It is theorized that while the general concept for controlling hydrogen sulfide vaporization using this general approach appears to have promise, large pond and lagoon settings likely will require significant volumes of water to dilute the peroxide and other potential additives for efficient coverage of the surface waters with treatment chemistry. It is further theorized that the only reasonable source for the large volumes of water necessary to accomplish adequate surface coverage will come from the wastewater within the targeted lagoons. Along these lines of thinking, to use the contaminated wastewater for this purpose will mean that the wastewater will need to be treated to a high level prior to use in spray application to the surface of the lagoon. Otherwise, the application will run the serious risk of adding volatile sulfide or other volatile toxic chemicals to the atmosphere that will defeat the purpose of this approach. Therefore, it is believed that a fully effective design using this approach will have to contemplate a system that would rapidly treat the wastewater before being used as a carrier for the excess treatment chemistry needed to seal the targeted lagoon surface. A lab version of this concept probably will need to be conducted to determine the efficacy of this concept prior to a field demonstration.

Bench Scale Continuous Sulfide Treatment Demonstration for Open Ponds and Lagoons Concept Introduction As described above, a bench scale study was conducted to demonstrate the efficacy of a design to cap hydrogen sulfide from escaping into the atmosphere from a body of water that was contaminated with high levels of sulfide at circumneutral pH (i.e., approximately 6.3 to approximately 8.5, approximately 6.5 to approximately 7.5, approximately 6.8 to approximately 7.2, etc., including all sub-ranges and values therebetween). Loss of toxic volatile contaminants into the atmosphere at a variety of industrial and municipal sites is an ongoing and, to date, largely unresolved problem. Hydrogen sulfide is a particularly hazardous compound that is most notable today because of the noxious odor that it causes, typically described as a rotten egg odor.

Control of volatile organic and odorous compounds over large, unmixed, or modestly mixed ponds and lagoons is difficult, largely because treatment agents must make direct contact with an offending compound to have success. Control of odors using chemistry that is capable of controlling a volatile organic or odorous compound are most often delivered in very high concentrations from the banks of ponds and lagoons by simply discharging containers of treatment chemistry into the ponds and lagoons through single hose or manifold and relying on minimal currents in those ponds and lagoons to disperse the chemicals within the entire body of water. This common method of delivery has resulted in significant over-use of treatment chemicals. Spraying treatment chemistry directly into the atmosphere is commonly discouraged because many of the treatment agents are toxic to breath in their delivered concentration and, also, because they can not be used in high enough volumes to achieve adequate coverage of large ponds and lagoons due to cost considerations.

Certain exemplary embodiments can provide systems and/or methods that utilize contaminated pond and lagoon wastewater as a diluent for treatment chemistry. Such systems and/or methods can rely on the uptake of significant volumes of contaminated wastewater from the offending pond or lagoon in combination with ongoing injection of oxidant(s) or combination of oxidants/catalyst or a sequestration chemistry, such as triazine (in the case of sulfide). The injected chemistry can be mixed in-line with wastewater from the pond/lagoon. Wastewater and treatment chemistry then can travel through an appropriately sized retention chamber that contemplates the complete destruction or sequestration of the offending compound(s) prior to release back into the pond or lagoon. Treated wastewater can be returned to the pond or lagoon under sufficient pressure to activate a spray system designed to efficiently cover all or most of the pond/lagoon surface area with treated wastewater. The returning treated wastewater can contain specifically-calculated excess amounts of additional treatment chemistry for continued treatment within the surface water of the receiving offending pond/lagoon. The rate of coverage through the recirculation system can be designed to be sufficient enough to continuously build a layer of treated, toxin-free wastewater, along with excess treatment chemistry. The method can seal toxins into the lagoon while adding a continuous flow of additional treatment chemistry to add to the efficiency of the approach. The rate of return can vary depending on circumstance. A typical minimum rate of return would contemplate ~0.5 cm of added surface depth of treated wastewater per hour (for any desired number of hours) to mitigate the potential for toxins from escaping to the atmosphere. For example, this approach would result in 12 cm of depth of treated wastewater with excess treatment chemistry applied to the surface of a pond or lagoon over a 24 hour period.

Rapid, efficient oxidation treatment methods can be utilized for the bench scale system, such as with methods and/or chemistries described in U.S. Pat. Nos. 6,960,330, 7,745,680, 7,846,408, 7,928,277, 7,968,761, 8,480,924, and/or 8,609,926 (each of which is incorporated by reference herein in its entirety and its contextually relevant part). Hydrogen peroxide, peracetic acid, persulfate, percarbonate, permanganate, chlorine dioxide, hypochlorite, chlorite, ozone, singlet oxygen, superoxides, and/or other like oxidation chemistries can be used within this system. However, sequestration chemistry, such as triazine and similar amine based chemistries, can be effective using this methodology.

Methods

Conceptual Bench Scale Design

A ten gallon aquarium tank was utilized to test the conceptual design for the Pond/Lagoon Volatile Organic and Hydrogen Sulfide Control System. Mixed liquor activated biosolids wastewater from the Spotsylvania County Wastewater Plant was used for all studies for bench scale work. Once full of wastewater, the tank was allowed to sit for 2 hours without mixing to allow bacteria within activated biosolids in the tank to utilized much of the oxygen within the tank. This step was seen to minimize the amount of natural oxidation of added sulfide by sulfide-oxidizing bacteria present in the biosolids. Sodium hydrosulfide was added to 35 liters of wastewater to achieve a starting total sulfide concentration of ~10 mg/l sulfide. The pH was adjusted within the aquarium to a pH of 7.0 using a dilute solution of hydrochloric acid. In all cases, chemical mixing was done slowly so as to minimize dissolution of oxygen. The aquarium was located under a hood to minimize exposure to the resulting hydrogen sulfide gas.

An Odalog (0-1,000 ppm), from Detection Instruments of Phoenix, Ariz., was used to monitor hydrogen sulfide escaping from the surface of the aquarium. The Odalog was affixed using a ring stand to achieve a one centimeter gap between the intake of the Odalog and the surface of the aquarium. One centimeter of depth in a 10 gallons aquarium is equivalent to 1.29 liters of liquid, therefore, a target for the spray system flow was selected to be 21.5 milliliters of overall recirculation flow per minute for all treatment chemistry and recirculated wastewater to achieve one centimeter depth of treated wastewater per hour. Wastewater was pulled from near the bottom of the aquarium using a Watson-Marlow Peristaltic Pump capable of delivering 0.001-190 mls/minute. An additional Watson-Marlow Pump (dual channel) of the same size was used to pull hydrogen peroxide and VTX catalyst from separate vessels for injection into a return line. The return line was of sufficient length and diameter to assure approximately 5 minutes of contact time (some of our other studies have revealed that anywhere between approximately 2 and approximately 10 minutes (such as approximately 3, 4, 6.5, etc. minutes) of contact time can be sufficient to destroy >99% of the hydrogen sulfide in wastewater), between the treatment chemistry and the sulfide-containing wastewater and the spray discharge. The volume of the line prior to discharge equated to ~100 milliliters. A delivery spray system was mimicked by drilling small holes (0.35 mm) into 0.25 inch tubing distributed evenly above the aquarium. Holes drilled into the tubing was accomplished by trial and error with a goal of achieving good surface coverage within the confines of using ~21.5 milliliters of wastewater per minute. A filtration devise was installed in-line to minimize particle clogging with the intake in the tank above the settled biosolids to aid in this process.

The Control Bench Scale Testing was conducted over 1 hour to determine the efficiency of exposure of untreated wastewater to the atmosphere and, also, to determine the effect on total sulfide in surface water due to the infused oxygen at the surface from spraying activity.

For Bench Scale Treatment 2 (Table 2 below) a dosage was established to achieve a concentration of hydrogen peroxide of 33 mg/l and a VTX catalyst concentration of 44 µg/l (micrograms/l) (as total iron) within the 1.29 liters of recirculation wastewater from the aquarium. This was the dose rate necessary to achieve substantially complete treatment of sulfide contained within the recirculation wastewater solution with about 15 mg/l of hydrogen peroxide remaining to treat sulfide within the top 1 cm of depth in the receiving surface wastewater. The ratio of 1.5 mg/l hydrogen peroxide per 1.0 mg/l sulfide in the presence of VTX catalyst is believed to be an sufficient ratio for treatment of ~1 mg/l sulfide at wastewater facilities using the aforementioned patented chemistry.

For Bench Scale Treatment 3, a dosage of hydrogen peroxide only was conducted using a hydrogen peroxide concentration identical to Treatment 2. No catalyst was added along with the peroxide in Treatment 3.

Testing for total sulfide in solution was conducted prior to beginning treatment at three depths. Hydrogen sulfide within the atmosphere above the tank was monitored every 10 minutes as were samples for total sulfide by depth.

Results

TABLE 1

Control with No Treatment

| Time | H2S Above H2O | Total Sulfide at Three Levels of Depth (mg/l) | | |
|---|---|---|---|---|
| Minutes | PPM | 1 CM Depth | 2 CM Depth | 3 CM Depth |
| 0 | 14 | 8.7 | 9.2 | 8.9 |
| 10 | 15 | 8.8 | 9.0 | 9.1 |
| 20 | 17 | 8.6 | 8.9 | 8.9 |
| 30 | 19 | 8.6 | 8.7 | 8.9 |
| 40 | 22 | 8.5 | 8.6 | 8.9 |
| 50 | 23 | 8.5 | 8.7 | 8.8 |
| 60 | 22 | 8.4 | 8.6 | 8.8 |

TABLE 2

Hydrogen Peroxide and VTX

| Time | H2S Above H2O | Total Sulfide at Three Levels of Depth (mg/l) | | |
|---|---|---|---|---|
| Minutes | PPM | 1 CM Depth | 2 CM Depth | 3 CM Depth |
| 0 | 17 | 8.9 | 9.2 | 9.2 |
| 10 | 3 | 7.1 | 9.1 | 9.3 |
| 20 | 2 | 5.9 | 8.3 | 9.2 |
| 30 | 0 | 4.0 | 7.1 | 7.8 |
| 40 | 0 | 3.1 | 5.9 | 7.3 |
| 50 | 0 | 1.1 | 4.4 | 7.2 |
| 60 | 0 | 0.6 | 3.3 | 7.0 |
| 120 | 0 | <0.1 | 1.1 | 1.8 |
| 180 | 0 | <0.1 | 0.2 | 0.2 |
| 240 | 0 | <0.1 | <0.1 | <0.1 |

TABLE 3

Hydrogen Peroxide alone

| Time | H2S Above H2O | Total Sulfide at Three Levels of Depth (mg/l) | | |
|---|---|---|---|---|
| Minutes | PPM | 1 CM Depth | 2 CM Depth | 3 CM Depth |
| 0 | 18 | 8.9 | 9.2 | 9.2 |
| 10 | 17 | 8.5 | 9.1 | 9.3 |
| 20 | 14 | 8.3 | 9.0 | 9.1 |
| 30 | 12 | 7.3 | 8.9 | 8.3 |
| 40 | 12 | 6.8 | 8.1 | 8.3 |
| 50 | 11 | 5.3 | 8.0 | 7.3 |
| 60 | 12 | 5.0 | 7.8 | 7.5 |
| 120 | 8 | 4.2 | 5.2 | 6.6 |
| 180 | 7 | 3.3 | 4.8 | 6.2 |
| 240 | 6 | 1.8 | 4.0 | 5.2 |

Discussion

The sealing of sulfide from escaping the aquarium into the atmosphere was clearly efficient for the hydrogen peroxide and VTX treatment and less so for the peroxide alone. Thus, hydrogen peroxide appears to react less efficiently with time than does the peroxide and VTX combination for sulfide treatment. Additionally, the VTX catalyst can be demonstrated to be reactivated in the presence of oxidants, including oxygen. Sulfide bonds to the VTX catalyst molecule and is released as elemental sulfur upon contact with an oxidant. The release of elemental sulfur results in the reactivation of the catalyst to react with additional sulfide. This factor adds considerably to the efficiency of the VTX catalyst and hydrogen peroxide combination. The application method worked with peroxide only. The slower reaction time for peroxide only allowed sufficient time for the peroxide to react with certain organic compounds within wastewater. The demand placed on peroxide by those organic compounds within the wastewater reduced the overall efficiency and/or ability of the peroxide for targeting sulfide. Higher dose rates and longer treatment time might be necessary to improve the efficacy of peroxide using this procedure. Therefore, it is likely that this method can be made to work with greater efficiency using higher dosages and extending the contact time for hydrogen peroxide and the returning contaminated wastewater.

Other oxidants that treat sulfide included in the list mentioned previously can be effective using this technique.

Conclusions

The method described herein proved effective for sealing hydrogen sulfide into the aquarium wastewater using two oxidation approaches.

The VTX catalyst and hydrogen peroxide combination was particularly effective, however, because hydrogen sulfide was sealed into solution in about 20 minutes under test conditions. No hydrogen sulfide was detected in the atmosphere above the aquarium test tank after control was gained for the duration of the test.

Hydrogen peroxide alone proved to be effective, although not as effective as the VTX and hydrogen peroxide combination. Adjustments to dosage and treatment contact time will likely result in adequate control using the hydrogen peroxide alone.

It is apparent that considerable design attention will need to be undertaken to utilize contaminated lagoon wastewater containing the offending volatile chemicals as a carrier for the addition treatment chemistry to the surface of a lagoon, including a substantial focus on the particular chemical treatment technique and/or the appropriate retention time needed for the selected treatment.

The use of rapidly treated wastewater from the hydrogen sulfide contaminated aquarium wastewater proved to be an effective carrier for the surface application of the excess treatment chemistry necessary to seal volatile hydrogen sulfide from escaping the surface wastewater into the atmosphere Evenly distributed wastewater containing excess treatment chemistry was an effective design element for producing a high level of control for volatile hydrogen sulfide gas in the test vessel.

An in-line retention time of 5 minutes for wastewater containing approximately 3-approximately 7 mg/l sulfide in the presence of treatment chemistry proved to be adequate for the VTX and hydrogen peroxide method. No hydrogen sulfide was detected within the atmosphere or within the top centimeter of surface wastewater receiving the spray application after 120 minutes of operation.

Case Study 4
Southern Minnesota Beet Sugar Cooperative Pilot Demonstration Study

SUMMARY

Control of hydrogen sulfide and volatile organic carbon (VOC) emissions from large bodies of water and wastewater is a persistent problem. With increasing limitations being imposed upon industries and municipalities for hydrogen sulfide and VOC emissions by regulatory agencies across the world, requirements for effective control of offending air emissions at property lines are being increasingly enforced.

In the State of Minnesota, atmospheric emission of hydrogen sulfide at industrial property lines is now being enforced at 30 parts per billion. Violations have been met with millions of dollars in fines for selected industries. Repeated efforts by a variety of companies in the business of treating hydrogen sulfide have resulted in mixed results with no clear completely effective solution demonstrated to this point in time. No systematic solution for effective, timely contact between various chemical treatments and hydrogen sulfide being emitted from large treatment lagoons has been demonstrated.

An exemplary system and method for controlling hydrogen sulfide was implemented at a very large lagoon in Renville, Minn. at the Southern Minnesota Beet Sugar Cooperative (SMBSC). The exemplary system and method demonstrated a high level of control of hydrogen sulfide escaping a 4,500 foot long by 400 foot wide by 3 to 4 foot depth wastewater treatment lagoon with very high concentrations of chemical oxygen demand (COD) in the range of approximately 2,000 to approximately 6,000 mg/l; approximately 2,000 to approximately 10,000 mg/l, etc., approximately 2,500 to approximately 8,000 mg/l, etc., including all sub-ranges and values therebetween. Importantly, the approach resulted in significant cost savings to SMBSC. High concentrations of hydrogen sulfide emissions had repeatedly left the atmosphere within the lagoon and violated emission standards at the property line on a number of occasions. Applications of truckloads of hydrogen peroxide and large amounts of peracetic acid were used in an attempt to control emissions at an extremely high cost to SMBSC. Violations, although less frequent, still occurred during the course of these treatments.

The exemplary system and method was designed to utilize 1.7 million gallons per day of the 35 to 40 million gallons of high strength wastewater within the lagoon as a carrier for treatment chemistry. Flow into the lagoon varied. Influent was mostly high organic strength wastewater. A typical daily flow rate approximated 500,000 gallons. Hydrogen sulfide was present in significant quantity within the wastewater being used as a carrier (taken at the effluent end of the lagoon), so it was desirable that the treatment be completely effective in treating hydrogen sulfide in the carrier wastewater in under 5 minutes or, more specifically, at a treatment rate that is less than the retention time between the uptake of the wastewater at the point of treatment and the release of that wastewater to the atmosphere.

Treatment of hydrogen sulfide within high strength COD wastewater usually requires very high concentrations of treatment chemistry. The selected treatment system and method utilized chemistry (such as described in U.S. Pat. Nos. 6,960,330, 7,745,680, 7,846,408, 7,928,277, 7,968, 761, 8,480,924, and/or 8,609,926, each of which is incorporated by reference herein in its entirety and its contextually relevant part(s)), and was designed to quickly treat the hydrogen sulfide under high COD conditions. Relatively complete treatment was desired so that hydrogen sulfide was not released to the atmosphere as carrier wastewater was sprayed back over the surface of the lagoon. The utilized system and method sought to efficiently cover as much of the lagoon surface with treated wastewater containing excess quantities of treatment chemistry as practically possible. For spray nozzles, the system and method utilized 100 series Big Gun sprinklers (available from Nelson Irrigation Corporation of Walla Walla, Wash.) oriented in a pattern to assure maximum coverage of targeted surface area of the lagoon. Other methods to assure that high volumes of treated wastewater would be uniformly applied to the surface, however, can be used for the application. A John Deere Diesel Pump System designed to deliver 1205 gallons per minute of treated wastewater at around 47 pounds per square inch of water pressure to each of twelve Nelson 100 Big Gun sprinklers was used to supply treated wastewater. The pressure varied depending on the demand of the spray nozzles and surface coverage demand. Further, the effectiveness relied somewhat on delivery of sufficient volume of treated wastewater containing excess treatment chemistry to the surface of the lagoon to adequately suppress sulfide at or near the surface of the lagoon. This process was configured to substantially seal the surface of the lagoon with treatment chemistry that could efficiently contact and treat most, if not all, of the available hydrogen sulfide at the surface. An added advantage of this method was that a continual supply of wastewater free of hydrogen sulfide was being delivered to the surface of the lagoon. In the case of the surface area targeted by the exemplary system and method utilized within the SMBSC lagoon, this meant that approximately one foot of treated wastewater containing essentially no sulfide (<0.1 mg/l) and excess treatment chemistry for treating additional hydrogen sulfide was being applied to the surface of the lagoon every day. Treatment chemistry for the returned treated wastewater was dosed to treat sulfide within the uptake wastewater and over dosed with added treatment chemistry to accommodate the expected need for treatment within the surface water of the receiving lagoon. Typical dosages of treatment ingredients ranged from 1.5 mg to 2.0 mg of hydrogen peroxide and 25 micrograms to 35 micrograms of ferric gluconate (as iron) per 1.0 mg of hydrogen sulfide within the return wastewater and within the top 1.5 centimeters of the surface of the lagoon. This dosage application assumed these ratios for each hour of continuous treatment.

The rise of hydrogen sulfide within a lagoon can vary greatly depending on weather, the sulfide production rates within the lagoon, lagoon temperature and pH. The method used for this pilot study for dosing was estimated by taking surface and mid-depth samples of the untreated lagoon and testing for sulfide. The spray system was designed to return treated wastewater at a rate that approximated 1.25 centimeters of treated water depth per hour. The required excess hydrogen peroxide and ferric gluconate treatment dosage was calculated to assume the elimination of hydrogen sulfide within the top 1.25 centimeters of lagoon wastewater depth per hour on a continuous basis. The 1205 gallon per hour pump used to return treated wastewater for spray application assured an ongoing supply of treated wastewater to accommodate up to 1.25 centimeters of treated wastewater across the surface of the lagoon using Nelson Big Gun spray applicators as previously described. The hydrogen sulfide concentrations were assumed to approximate the range of sulfide concentrations in sampling test events of untreated wastewater. For the most part 1.5 mg/l of total sulfide was assumed to be the target for treatment per hour within the surface lagoon wastewater as well as within the recycled wastewater for spray application. Therefore, dosages of hydrogen peroxide and ferric gluconate were calculated to treat a total of 3 mg/l of hydrogen sulfide within returned wastewater or 1.5 mg/l for recycle wastewater and 1.5 mg/l for the lagoon surface. This dosage resulted in consistent treatment of sulfide to very low levels within surface wastewater. It should be noted that higher dosages of ferric gluconate can increase the rate of treatment. It can, therefore, be used in higher concentrations when a more rapid treatment result is needed. Overall, this approach resulted in zero measurable hydrogen sulfide within the atmosphere downwind of the treated surface of the lagoon. The method provided substantially continuous predictable control of sulfide.

Certain exemplary systems and/or methods can be used to treat a variety of commonly occurring hazardous VOCs. For example, per the below table, the chemistry utilized for the SMBSC lagoon also can treat a variety of recalcitrant volatile organic chemicals to include phenols, benzene, selected pesticides, and/or chlorinated organic compounds such as trichloroethylene and perchloroethylene. For these VOCs, the dose rate (mass/mass) was 3 to 5 parts oxidant and Catalyst per 1 part contaminant as COD.

| Target Compounds | Before Treatment (ppb) | After Treatment (ppb) | Reduction (ppb) |
|---|---|---|---|
| MTBE | 34,000 | <5 | >34,000 |
| Benzene | 282,978 | <5000 | >277,978 |
| Toluene | 156,238 | <5000 | >151,238 |
| 1,2-Dichloropropane | 109,686 | <5000 | >104,686 |
| Trichloroethylene | 502,000 | <5 | >500,000 |
| 1,1-Dichloroethane | 74,745 | <5000 | >69,745 |
| Tetrachloroethylene | 31,000 | <10 | >30,990 |
| cis 1,2-Dichloroethylene | 5,000 | <10 | >4,990 |
| Vinyl chloride | 24 | <10 | >14 |
| Ethylbenzene | 50,574 | <5000 | >45,574 |

SMBSC System Design Trials
Trial One
  Area of Treatment: 302,326 square feet
  Flow Rate: 1205 gallon per hour
  Dosage: ~150 gallons of ferric gluconate and ~600 gallons of 35% hydrogen peroxide per day

TABLE 1

Sulfide Results in Wastewater at Selected Locations

Aqueous Sulfide (ppm) by Sampling Location

| TRIAL 1 | D1 | 1S | 1M | 2S | 2M | 3S | 3M |
|---|---|---|---|---|---|---|---|
| T1 | — | 1.35 | 1.24 | 0.56 | 0.58 | 0.69 | 0.8 |
| T2 | 0.6 | 0.00 | 0.00 | 0.08 | 0.11 | 0.13 | 0.08 |
| T3 | 0.42 | 0.00 | 0.00 | 0.00 | 0.00 | 0.00 | 0.00 |
| T4 | 0.3 | 0 | 0 | 0.00 | 0.00 | 0.08 | 0.09 |
| T5 | 0.25 | 0 | 0.05 | 0.00 | 0.00 | 0.08 | 0.07 |

TABLE 2

Sulfide Results within Atmosphere Downwind at Lagoon Edge

Gaseous Sulfide (ppm)

| Time | Dam Inlet | Station 2 | Station 3 |
|---|---|---|---|
| T1 | 0.00 | 0.00 | 0.00 |
| T2 | 0.03 | 0.00 | 0.00 |
| T3 | 0.00 | 0.00 | 0.00 |
| T4 | 0.00 | 0.00 | 0.00 |
| T5 | 0.00 | 0.00 | 0.00 |

Conclusions
At the first sulfide sampling, high sulfide levels were noted across all sampling stations, from the first station at the dam inlet (D1), down to the final sampling station (3M). Treatment at a rate of 300 gallons per day of ferric gluconate and 600 gallons per day of 35% Hydrogen Peroxide began using an exemplary system and method. Sulfide levels were noted to decrease in subsequent water tests (Table 1). Corresponding air-based samples, taken using an OdaLog L2 Hydrogen Sulfide testing unit were also noted to be low (Table 2), and in compliance with regulations for the State of Minnesota, where the trial took place. While results for this trial appeared to be successful, it was later discovered that large volumes of Hydrogen Peroxide was being deployed into the study area and might have caused false positive results for the trial. As result, it was concluded that another trial would take place.

Trial Two

Area of Treatment: 302,326 square feet

Flow Rate: 1205 gallon per minute

Dosage: ~150 gallons of Ferric Gluconate and ~600 gallons of 35% Hydrogen peroxide per day

TABLE 3

Sulfide Results in Wastewater at Selected Locations

| TRIAL 2 | Aqueous Sulfide (ppm) by Sampling Location | | | | | | |
|---|---|---|---|---|---|---|---|
| Time | D1 | 1S | 1M | 2S | 2M | 3S | 3M |
| T1 | 0.92 | 0.73 | 1.72 | 0.42 | 0.43 | 0.85 | 1.25 |
| T2 | 1.79 | 0.20 | 0.20 | 0.38 | 0.37 | 0.36 | 0.35 |
| T3 | 0.93 | 0.30 | 0.03 | 0.20 | 0.13 | 0.30 | 0.43 |
| T4 | 1.10 | 0.23 | 0.22 | 0.10 | 0.04 | 0.18 | 0.18 |
| T5 | 1.01 | 1.00 | 0.18 | 0.10 | 0.27 | 0.15 | 0.25 |
| T6 | 0.92 | 0.25 | 0.27 | 0.17 | 0.19 | 0.16 | 0.17 |
| T7 | 0.98 | 0.22 | 0.24 | 0.08 | 0.13 | 0.14 | 0.19 |

TABLE 4

Sulfide Results within Atmosphere Downwind at Lagoon Edge

| | Gaseous Sulfide (ppm) | | |
|---|---|---|---|
| Time | Dam Inlet | Station 2 | Station 3 |
| T1 | 0.70 | 0.00 | 0.00 |
| T2 | 0.11 | 0.01 | 0.01 |
| T3 | 0.50 | 0.00 | 0.01 |

Conclusions

A second trial using an exemplary system and method was started after all chemical treatment had been shut off in an effort to allow Sulfide levels to grow. By the first sampling, sulfide levels were observed to be high, ranging from 1.72 ppm at station 1M to 0.42 ppm at station 2S (Table 3). However, as the exemplary system and method continued deploying chemistry, sulfide levels began to decrease in all stations except D1 (which was expected). Station D1 referred to a dam where water flowed down through the dam into the remaining run of the retention lagoon. As result, treatment chemistry could not flow above the dam, resulting in dam readings always being higher than downstream readings where the exemplary system and method was able to deploy treatment chemical. Air readings were also noted to be low (Table 4) and within compliance.

Conclusions

An exemplary system and method was noted to effectively control the release of Hydrogen Sulfide across the lagoon using a novel treatment approach. Sulfide levels were found to decrease upon the activation of the system on two separate trials, and in one trial where no outside factors were influencing results. The system and method was capable of covering approximately 40% of the total lagoon surface area, so additional study might be helpful using a full scale system which covers the entire lagoon. Results for such a study are expected to be favorable given the success of the trials mentioned above.

Thus, our studies have shown that certain exemplary embodiments can successfully maintain substantially complete control of sulfide escaping to the atmosphere from a body of wastewater (such as a lagoon) with highly variable amount of sulfide in solution by returning enough treated wastewater to cover the surface of that body of water with about 1.25 centimeters/hours of treated wastewater containing typically less than 1 mg/l of hydrogen peroxide containing a minimum of 50 mg/l $H_2O_2$ and a minimum of 12.5 mg/l ferric gluconate catalyst. The demand of hydrogen peroxide within the anaerobic return wastewater was significant. Of a typical feed rate of ~50 mg of peroxide per liter of a returned wastewater, 80% to 90% was depleted within the five minutes of contact time within the recirculation system. Therefore, we anticipated having something less than 5.0 mg/l of hydrogen peroxide making it to the surface of the lagoon. The Ferric gluconate would make it thru the recirculation system without any significant loss in concentration. At this point, we have confidence that further study will identify much closer control levels. We anticipate those control levels to be less than those we witnessed to date.

Certain exemplary systems and methods can provide an approach where the wastewater has to remain in the system for very little time before being used as a carrier for additional treatment chemistry (e.g., peroxide and ferric— MGDA, ferric gluconate, and/or another ferric chelate to be actively applied to the surface of the lagoons to suppress vapors. If such lagoons are undertreated then the problem might be exacerbated by actually encouraging the loss of untreated hydrogen sulfide into the atmosphere by spraying wastewater into the air. It can be helpful for the systems and/or methods used to provide a very highly efficient (e.g., >99%) treatment of the offending chemical occur before wastewater containing it is used as a carrier for excess suppression chemistry that is spray applied to the surface of lagoons. Retention time to allow that treatment has a minimum time but not necessarily a maximum time after the treatment is complete for the return water. There can be a variable maximum time in situations where all of the treatment chemistry is used up by non-targeted organic contaminants in the wastewater that completely depletes the amount of chemistry added. That is highly variable depending on circumstance. Certain exemplary embodiments can hit the "sweet spot" where the offending chemical is controlled in the returning wastewater and enough treatment chemistry is left over to treat the surface of the lagoon to suppress any vapors that are escaping to the atmosphere. That delivery concentration can be very, very low, as in micrograms per liter of surface water. The idea is to contact contaminants as they rise to the surface with enough chemistry to disallow their escape to the atmosphere. In practice, it can be desirable to put enough clean water (as in devoid of the offending vapor) on the surface to build a constantly growing layer of "clean water" on the surface that provides a barrier unto itself and/or assures that any (or at least almost all) additional offending volatile compounds that make it to the surface will be confronted by excess treatment chemistry within the surface of the lagoon water. The excess treatment chemistry can arrive on a continuous or semi-continuous basis, depending on the demand of the situation.

Criteria that can be included within the design currently are as follows:
1. In order to have a sufficient volume of water to assure complete coverage of the lagoon surface, it is typically most practical, for cost and efficiency purposes, to utilize the wastewater within the offending lagoon as a carrier for the treatment chemistry necessary to efficiently cover the surface of the lagoon.
2. Sufficient retention time can be designed into the system to assure that the wastewater being utilized for spray application of treatment chemistry has the retention time needed within the recycle system for treatment of the offending volatile compounds by the treatment method, such that few or no volatile emissions remain in the wastewater to add to the problem.
3. The spray application system can supply coverage for the great majority of exposed lagoon surface area to maximize contact between treatment chemistry and the offending volatile compound.
4. The volume of returning wastewater with excess treatment chemistry can be of sufficient volume to build a substantially continuously growing layer of treated wastewater containing excess treatment chemistry. Data from this study suggest that 1.5 centimeters of water depth per hour was sufficient for controlling the hydrogen sulfide issue at the SMBSC lagoon.
5. High strength Chemical Oxidation Demand (COD) wastewater (i.e., >1,000 mg/l), such as that found in wastewater ponds and lagoons, is nearly always anaerobic and, therefore, typically has a very high demand for oxidants. During this pilot study, the sulfide in the wastewater reacted upon contact with the ferric gluconate, and then was converted to elemental sulfur via contact with hydrogen peroxide or atmospheric oxygen, thus allowing for a high degree of efficiency with respect to chemical demand. This allowed for the design of a smaller system than would otherwise be the case with a far less efficient chemical treatment process, such as hydrogen peroxide alone.

Part 6: Full Scale Lagoon Treatment System

Introduction

A full scale trial using an exemplary system and method was constructed at the Southern Minnesota Beet Sugar Cooperative (SMBSC) to treat a large, unmixed wastewater lagoon containing hydrogen sulfide and high concentrations of chemical oxygen demand (COD) in the range of 2,000 to 10,000 mg/l. The system did not contemplate treatment of the COD but did contemplate control of hydrogen sulfide gas from escaping into the atmosphere from the surface of the lagoon. The system was designed to treat sulfide and recirculate sulfide-free wastewater from the lagoon in a continuous manner and reuse the treated wastewater in such a manner as to gain substantially complete control of hydrogen sulfide escaping to the atmosphere. Control was gained by using the treated sulfide-free wastewater to cover and effectively cap the lagoon, thus greatly reducing the potential for hydrogen sulfide gas to escape to the atmosphere. The capping of the lagoon was accomplished by spray applying sulfide-free treated wastewater using a spray application system specifically designed to gain complete or nearly complete coverage of the surface area of the lagoon. Importantly, the spray application system imparted minimal mixing to the untreated surface of the lagoon. Any significant mixing of the surface water within the lagoon could be problematic for hydrogen sulfide release. Gently spray-applying sulfide-free water over the lagoon served to effectively cap the lagoon with minimal mixing, thus preventing gaseous sulfide from escaping to the atmosphere. Further, by assuring that the treated wastewater returning to the lagoon surface contained excess oxidation treatment chemicals, any fugitive sulfide that might have risen through the cap could be mitigated.

The volume of wastewater being returned to cap the lagoon can be variable based on results confirming low concentration of sulfide within the surface of the lagoon. Environmental conditions can impact unmixed lagoons such as the ones at SMBSC. The primary conditions that can affect this process can include wind speed and temperature changes. High wind conditions can impart an increase to surface mixing with increased wind speed. Temperature changes can affect density in surface water, potentially causing mixing to occur from top to bottom as temperature in the surface water falls below the temperature of wastewater below the surface. While both of these conditions can be factors that can negatively impact the approach, in this experiment the overall success rate of the process was positive and resulted in sufficient control of hydrogen sulfide escaping to the atmosphere in excess of regulatory standards.

Materials

Equipment for construction of the treatment process was supplied by Roberts Irrigation Company, Inc. located at 1500 Post Rd. Plover Wis. 54467 and primarily comprised the following:
Electrically driven high volume Cornell centrifuge pump (1400 gallons per minute)
27×Nelson F100 Sprayer Heads mounted on floating platforms
12" High Density Polyethylene (HDPE) intake line running into Cornell Pump system
8" HDPE output line running out of pump down center of lagoon
2" HDPE piping running from 8" output line to each Nelson F100
Verdeflex Dura 15 and 25 Metering Pumps
Chemical Test Equipment:
Acorn 6 pH Meter for testing lagoon and treatment pH was supplied by Cole Parmer of 625 East Bunker Ct Vernon Hills, Ill. 60061
Hach DR900 for aqueous sulfide sampling was supplied by Cole Parmer of 625 East Bunker Ct Vernon Hills, Ill. 60061
Treatment Chemicals:
HydriTreat HS CF (Ferric Gluconate) and Hydrogen Peroxide was supplied by Hydrite Chemical Company of 300 N. Patrick Blvd. Brookfield, Wis. 53045

Methods

Figure 5:
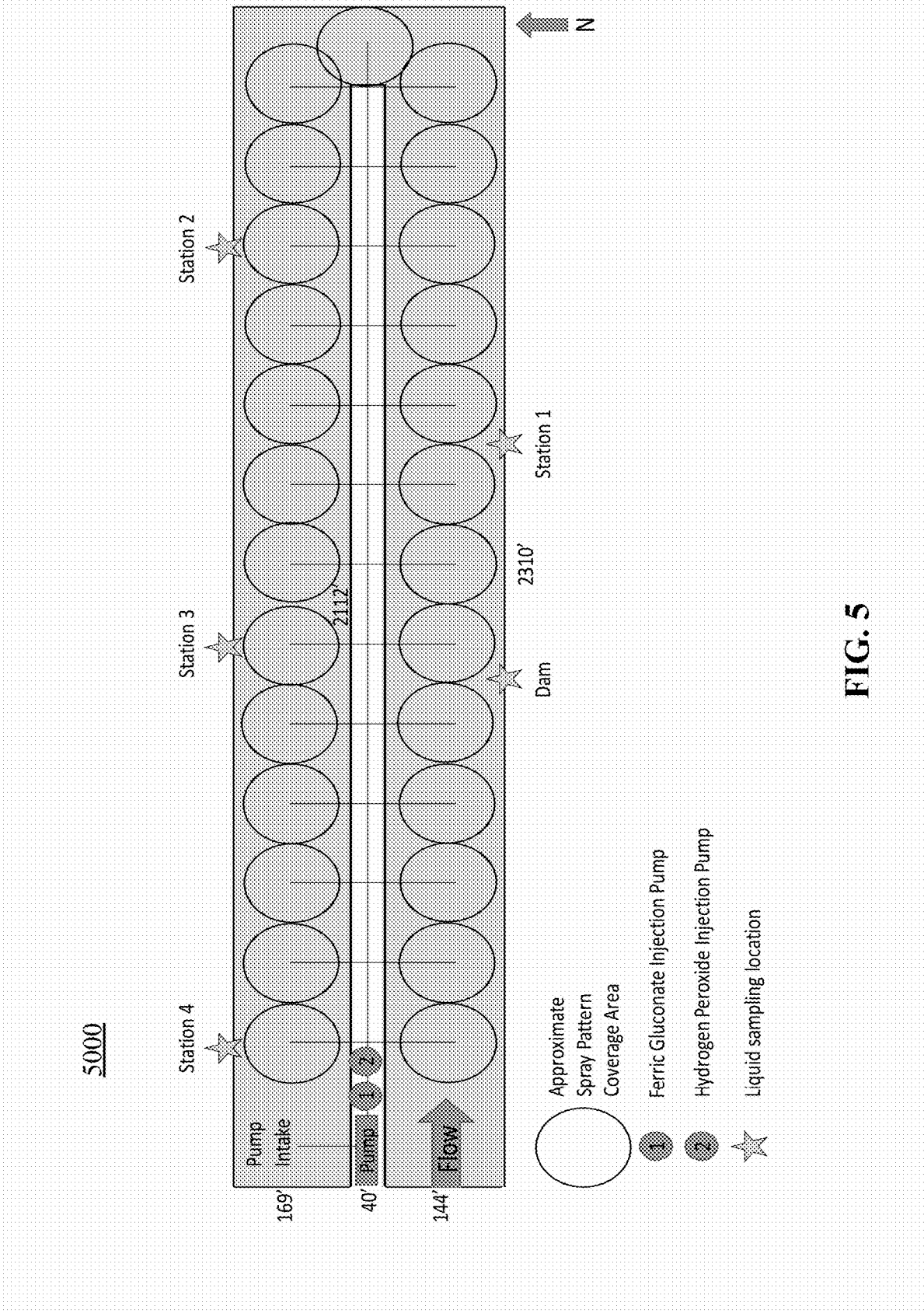
FIG. 5 is a block diagram of an exemplary embodiment of a system 5000.

As shown in FIG. 5, in system 5000, untreated high COD wastewater enters the lagoon via the southwest side and proceeds eastward as denoted by the "flow" directional arrow graphic in the diagram above. The water proceeding eastward turns north at the end of the lagoon and travelling back westward where it is pumped out of the lagoon at the northwest end.

This system is primarily driven by a large electrically powered Cornell pump denoted by the "Pump" box in FIG. 5. The pump sits on a 40' wide elevated dyke that runs down the center of the lagoon. Water is pumped out of the northwest side of the lagoon via a 12" HDPE "Pump Intake" pipe and flows through the Cornell pump and then down the dyke in the center of the lagoon via an 8" HDPE main pipe. Ferric Gluconate and Hydrogen Peroxide were dosed in line downstream from the Cornell main pump directly into the 8" main pipe using Verdeflex Dura 15 and 25 metering pumps. These injection locations are designated by the "1" and "2" circles in FIG. 5. T valves were installed into the 8" main line, redirecting a portion of the water from the 8" main pipe out to each of 27 different floats via 2" HDPE piping. The Nelson F100 series Big Gun spray irrigation heads were mounted on the floats and directly connected to the 2" HDPE piping. Around 47 PSI of water pressure was constantly maintained to allow sufficient working pressure for each of the 27 spray irrigation heads. The chemical being dosed into the line via the Verdeflex pumps was carefully calculated to ensure sufficient Ferric Gluconate and Hydrogen Peroxide were present in the line to not only ensure substantially complete destruction of all sulfide in the line but to provide a surplus of chemicals for additional treatment upon contact with any sulfides in the pond. The spray system as designed was capable of applying approximately 0.5 to 1.25 centimeters depth of treated wastewater to the surface of the lagoon every hour. With proper dosage of oxidation chemicals, the wastewater spray contained 0.00 mg/l sulfide upon exiting the spray nozzles. The system was built to allow Nelson F100 sprayer heads to rain treated water and excess chemicals over the majority of lagoon surface area, thereby creating a physical and chemical barrier against sulfide volatilization. Liquid samples were taken across the lagoon in each of the sampling stations outlined in FIG. 5 in order to verify sulfide destruction and system effectiveness using a Hach DR900 spectrophotometer.

Area of Treatment: 762,134 square feet
Flow Rate: 1400 gallon per minute
Dosage: ~240 gallons of Ferric Gluconate and ~540 gallons of 50% Hydrogen peroxide per day
Results

TABLE 1

Aqueous sulfide sample results by station

| Date | Treatment System On? | Dam | Station 1 (surface) | Station 2 (surface) | Station 3 (surface) | Station 4 (surface) |
|---|---|---|---|---|---|---|
| Mar. 28, 2016 | No | 4.90 | 0.80 | — | 0.50 | 0.30 |
| Mar. 29, 2016 | No | 4.00 | 1.90 | — | 1.40 | 1.10 |
| Mar. 30, 2016 | No | 0.26 | 1.01 | 0.41 | 0.24 | — |
| Mar. 31, 2016 | No | 1.10 | 0.11 | 0.00 | 0.09 | 0.03 |
| Apr. 1, 2016 | Yes | 0.00 | 0.00 | — | 0.50 | 0.00 |
| Apr. 4, 2016 | Yes | 0.00 | — | 0.00 | 0.00 | 0.00 |
| Apr. 5, 2016 | Yes | 0.24 | 0.00 | 0.00 | 0.00 | 0.00 |
| Apr. 6, 2016 | Yes | 0.16 | 0.00 | — | 0.00 | 0.00 |
| Apr. 7, 2016 | Yes | 1.80 | 0.00 | — | 0.00 | 0.00 |
| Apr. 8, 2016 | Yes | 0.20 | 0.00 | — | 0.00 | 0.00 |
| Apr. 10, 2016 | Yes | 0.20 | — | — | — | 0.00 |
| Apr. 11, 2016 | Yes | 0.00 | — | 0.00 | — | 0.00 |
| Apr. 13, 2016 | Yes | 0.00 | — | — | — | 0.00 |
| Apr. 15, 2016 | Yes | 0.00 | — | 0.00 | — | 0.00 |
| Apr. 18, 2016 | Yes | 0.15 | — | 0.03 | — | 0.00 |
| Apr. 19, 2016 | Yes | 0.00 | — | 0.00 | — | 0.00 |
| Apr. 22, 2016 | Yes | 0.00 | 0.00 | — | 0.00 | 0.00 |
| Apr. 25, 2016 | Yes | 0.00 | — | 0.00 | — | 0.00 |
| Apr. 27, 2016 | Yes | 0.00 | — | — | — | 0.00 |
| Apr. 29, 2016 | Yes | 0.00 | — | — | — | 0.00 |

Prior to treatment initiation, samples were taken starting on Mar. 28, 2016 through the end of March and sulfide levels were observed to be elevated each day. After four days of taking aqueous sulfide samples across five sampling locations on the untreated lagoon, an average sulfide measurement of 1.06 mg/l was observed with readings ranging from 0.00 to 4.90 mg/l (Table 1). On Apr. 1, 2016 the system and method were started. The system was run each day for twelve hours during the night as there was concern by individuals at SMBSC about fugitive spray from the sprayer system. Treatment took place from approximately 18:00 in the evening to 6:00 the next morning for the entire month of April 2016. A quantity of 45 gallons per hour (540 gallons per 12 hour period) of 50% Peroxide and 20 gallons per hour of Ferric Gluconate (240 gallons per 12 hour period) were pumped into the lagoon via the sprayer system.

Conclusions

The treatment system was effective at reducing sulfide levels in the surface water of the SMBSC lagoon. After one month of taking aqueous sulfide samples across five sampling locations on the lagoon, an average sulfide measurement of 0.06 mg/l was observed with readings ranging from 0.00 to 1.80 mg/l. It was noted that nearly all of the samples that contained greater than 0.10 mg/l of sulfide were observed in the Station 1 sampling location, which is where the high COD influent entered the lagoon and has historically been recognized as the most active location for anaerobic sulfide production. That said, the concentrations of sulfide did not result in violations for SMBSC during those periods.

Full Scale Lagoon Treatment System Using Eductors

Introduction

Due to concerns about fugitive airborne spray entering the environment and, potentially, drifting onto a nearby public road, SMBSC management requested an underwater eductor system be installed to replace the Nelson spray irrigation system described previously. Therefore, a full scale trial using a commercially available surface chemical application system and method was tested at the SMBSC. The objective of the test was to determine if a system designed to apply oxidation treatment chemicals just below the surface of the large wastewater lagoon at SMBSC was as effective as the spray system that minimized surface mixing. It was surmised that the system would achieve similar results to the spray application approach due to minimal disturbance to lagoon subsurface wastewater. The eductor system slowly spun in a circular pattern similar to the circular pattern of the spray system. The Serfilco eductor system pulled wastewater from the contaminated lagoon using the identical system of treatment used for the Nelson spray system. The only variation was the application mechanism of eduction versus spray. The eduction system relied on the force of the wastewater flowing back into the eductor distribution arms to force the circular motion of the arms distributing oxidation chemicals. All aspects of the system were the same except for the distribution system. The eductor system was an effective manner in which to evenly distribute chemicals but it also imparted some obvious mixing to surface wastewater to the 8" of depth of the distribution arms.

The full scale system used in this trial utilized the same electrically driven Cornell pump capable of pumping 1400 gallons per minute at around 47 PSI. Serfilco ⅜" eductors were chosen as the replacement to the Nelson spray system. All lagoon characteristics remained the same as previous trials with the only major change to the treatment system being the use of the near-to-surface eductors. Twenty seven (27) Serfilco eductors were installed approximately 8-10" below the surface of the lagoon. The eductors functioned by applying the treated water with excess oxidation chemicals in a circular pattern below the surface of the lagoon. Applying chemicals in this manner obviously eliminated the concern for production of overspray. The system was employed for the entire month of September 2016.

Materials

Equipment for construction of the treatment process was supplied by Roberts Irrigation Company, Inc. located at 1500 Post Rd. Plover Wis. 54467 and primarily consisted of the following:

- Electrically driven high volume Cornell centrifuge pump (1400 gallons per minute)
- 27×3/8" Serfilco Eductors mounted approximately 8" below the water surface on the bottom of floating platforms. Eductors can be purchased from Serfilco, LTD 1777 Shermer Road Northbrook, Ill. 60062
- 12" High Density Polyethylene (HDPE) intake line running into Cornell Pump system
- 8" HDPE output line running out of pump down center of lagoon
- 2" HDPE piping running from 8" output line to each Nelson F100
- Verdeflex Dura 15 and 25 Metering Pumps
- Chemical Test Equipment:
  - Acorn 6 pH Meter for testing lagoon and treatment pH was supplied by Cole Parmer of 625 East Bunker Ct Vernon Hills, Ill. 60061
  - Hach DR900 for aqueous sulfide sampling was supplied by Cole Parmer of 625 East Bunker Ct Vernon Hills, Ill. 60061
- Treatment Chemistry:
  - HydriTreat HS CF (Ferric Gluconate) and Hydrogen Peroxide was supplied by Hydrite Chemical Company of 300 N. Patrick Blvd. Brookfield, Wis. 53045

Methods:

The system was built to allow Serfilco 3/8" eductors to deliver chemicals in a circular pattern underwater providing chemicals to the entire lagoon area. System utilized all of the same equipment described in the previous case study, the only difference between the systems was the usage of 3/8" Serfilco Eductors instead of Nelson F100 Spray nozzles. Samples were taken across the lagoon in order to verify sulfide destruction and system effectiveness.

- Area of Treatment: 762,134 square feet
- Flow Rate: 1400 gallon per minute
- Dosage: ~600 gallons of Ferric Gluconate and ~1000 gallons of 50%
- Hydrogen peroxide per day

TABLE 2

| Date | Treatment System On? | Aqueous Sulfide (mg/l) by Sampling Location | | |
|---|---|---|---|---|
| | | Dam | Station 1 (surface) | Station 2 (surface) |
| Sep. 1, 2016 | Yes | 4.23 | 2.42 | 1.21 |
| Sep. 2, 2016 | Yes | 2.75 | 2.71 | 0.81 |
| Sep. 6, 2016 | Yes | 1.9 | 2.76 | 1.16 |
| Sep. 7, 2016 | Yes | 23.9 | 4.43 | 0.71 |
| Sep. 8, 2016 | Yes | 2.37 | 3.89 | 1.36 |
| Sep. 13, 2016 | Yes | 0 | 3.86 | 2.25 |
| Sep. 14, 2016 | Yes | 1.73 | 4.38 | 3.14 |
| Sep. 15, 2016 | Yes | 0.11 | 3.92 | 1.27 |
| Sep. 16, 2016 | Yes | 0.17 | 0.06 | 0.2 |
| Sep. 19, 2016 | Yes | 0.83 | 3.97 | 1.95 |
| Sep. 20, 2016 | Yes | 1.04 | 3.03 | 0.91 |
| Sep. 21, 2016 | Yes | 1.8 | 1.63 | 0.44 |
| Sep. 23, 2016 | Yes | 3.17 | 0.8 | 0.31 |
| Sep. 26, 2016 | Yes | 0.62 | 0.1 | 0.3 |
| Sep. 27, 2016 | Yes | 0.71 | 0.12 | 0.28 |
| Sep. 30, 2016 | Yes | 2.74 | 0.18 | 0.27 |

Results

The eductor approach was used for the entire month of September with limited success. The approach did not control sulfide in the lagoon, despite higher oxidation and catalyst dosages of chemicals being utilized. An average sulfide measurement of 2.14 mg/l was observed across all stations with sulfide readings ranging from 0.0 mg/l to 4.43 mg/l (Table 2.). The eductor system was not effective in controlling sulfide levels in the lagoon while using far greater quantities of peroxide than were used in Trial 1 (1000 gallons/day vs. 540 gallons/day) and Ferric Gluconate (600 gallons vs. 240 gallons).

Conclusions

The eductor system was not effective in controlling sulfide levels in the lagoon. Significant quantities of chemicals were being used by the eductors and sulfide levels remained non-compliant and elevated. The eductor system was moving a large volume of treated waste-water below the surface of the lagoons and it is believed that this served to disturb sulfide laden water further below the eductors rather than providing a sulfide free water cap on the top of the lagoon as had been demonstrated in the prior trial using all of the same equipment except the eductors.

Certain exemplary embodiments can provide a method comprising:

- continuously withdrawing, from an open container, contaminated water having a chemical oxygen demand of between approximately 2,000 mg/l and approximately 10,000 mg/l;
- causing reactions, between sulfides in the contaminated water with a ferric chelate and between sulfides in the contaminated water with an oxidizing agent, to form substantially sulfide-free water, the substantially sulfide-free water comprising the ferric chelate and the oxidizing agent;
- spraying the substantially sulfide-free water onto a top surface layer of the contaminated water in the container;
- substantially suppressing escape of gaseous hydrogen sulfide from the top surface layer;
- applying an aqueous solution comprising the ferric chelate to the contaminated water;
- applying an aqueous solution comprising the oxidizing agent to the contaminated water;
- applying an aqueous solution comprising the ferric chelate to the contaminated water and separately applying an aqueous solution comprising the oxidizing agent to the contaminated water;
- applying an aqueous solution comprising the ferric chelate to the contaminated water separately and substantially simultaneously applying an aqueous solution comprising the oxidizing agent to the contaminated water;
- applying an aqueous solution comprising the ferric chelate to the contaminated water separately, and sequentially applying an aqueous solution comprising the oxidizing agent to the contaminated water;
- mixing an aqueous solution comprising the ferric chelate with the contaminated water;
- mixing an aqueous solution comprising the oxidizing agent with the contaminated water;
- via the reactions, converting the sulfides to elemental sulfur;
- retaining the contaminated water, ferric chelate, and oxidizing agent within one or more enclosed treatment vessels for sufficient time for the ferric chelate and oxidizing agent to reduce the concentration of the sulfides in the contaminated water to less than 0.1 mg/l;
covering the top surface layer of the contaminated water in the container with the substantially sulfide-free water;
substantially preventing mixing of the contaminated water within the top surface layer;
wherein:
a sufficient quantity of the substantially sulfide-free water is applied onto the top surface layer to increase a depth of the substantially sulfide-free water in the container by approximately 0.5 centimeters to approximately 1.5 centimeters per hour;
the ratio of sulfides in the substantially sulfide-free water contains to sulfides in the contaminated water is less than 1%;
the contaminated water has a pH between approximately 6.8 and 7.2 at the time of the reactions;
the contaminated water has a pH between approximately 6.3 and 8.5 at the time of the reactions;
the substantially sulfide-free water contains less than 0.1 mg/l of sulfide;
the concentration of the ferric chelate in the substantially sulfide-free water is approximately 25 micrograms to approximately 35 micrograms per 1.0 mg of hydrogen sulfide in the substantially sulfide-free water;
the concentration of the ferric chelate in the substantially sulfide-free water is less than 50 micrograms per 1.0 mg of hydrogen sulfide in the substantially sulfide-free water;
the concentration of the ferric chelate in the substantially sulfide-free water is greater than 5 ppm;
the concentration of the oxidizing agent in the substantially sulfide-free water is greater than 10 ppm;
the concentration of the oxidizing agent in the substantially sulfide-free water was approximately 1.5 mg to approximately 2.0 mg per 1.0 mg of hydrogen sulfide in the substantially sulfide-free water; and/or
the concentration of the oxidizing agent in the substantially sulfide-free water was less than 1.0 mg per 1.0 mg of hydrogen sulfide in the substantially sulfide-free water.

Definitions

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
acid—a compound capable of neutralizing alkalis and reddening blue litmus paper, containing hydrogen that can be replaced by a metal or an electropositive group to form a salt, or containing an atom that can accept a pair of electrons from a base. Acids are proton donors that yield hydronium ions in water solution, or electron-pair acceptors that combine with electron-pair donors or bases.
active ferric chelate—a ferric chelate that exhibits substantial activity toward oxidation of the contaminant to be degraded, i.e., is capable of generating free radicals or other reactive oxidants from an oxidant in the presence of a medium associated with a contaminant to be treated.
actively—via converting and/or amplifying voltages and/or currents, such as via a diode and/or transistor.
activity—an action, act, step, and/or process or portion thereof.
adapted to—made to, designed to, and/or configured to perform a specified function.
adjust—to change, modify, adapt, and/or alter.
aerobic—a condition where molecular oxygen is substantially present.
agent—a phenomenon, substance, and/or organism that exerts some force and/or effect.
air—the earth's atmospheric gas.
aminocarboxylate—a molecule containing carboxyl functional groups bound to an amine group.
anaerobic—a condition where molecular oxygen is substantially absent.
and/or—either in conjunction with or in alternative to.
any—one, some, every, and/or all without specification.
apparatus—an appliance and/or device for a particular purpose.
apply—to put to, on, and/or into action and/or service; to implement; and/or to bring into contact with something.
approximately—about and/or nearly the same as.
aqueous—related to, produced by, similar to, containing, and/or dissolved in water.
aqueous oxidizing solution—any solution comprising an oxidizing agent and water.
are—to exist.
associate—to join, connect together, accompany, and/or relate.
associated with—related to and/or accompanying.
at—in, on, and/or near.
at least—not less than, and possibly more than.
available—obtainable, not busy, not otherwise committed, accessible, present, suitable, and/or ready for use and/or service.
based on—indicating one or more factors that affect a determination, but not necessarily foreclosing additional factors that might affect that determination.
between—in a separating interval and/or intermediate to.
biosolids—stabilized and/or unstabilized solid, semi-solid, and/or slurried residuals generated by the biological treatment of sewage, petroleum refining waste, and/or industrial chemical manufacturing wastewater.
by—via and/or with the use and/or help of.
can—is capable of, in at least some embodiments.
cause—to bring about, provoke, precipitate, produce, elicit, be the reason for, result in, and/or effect.
chelating agent (a.k.a. "chelate")—a heterocyclic compound having a central metallic ion attached by coordinate and/or covalent bonds to two or more nonmetallic atoms in the same molecule.
chemical oxygen demand—a test is commonly used to indirectly measure the amount of organic compounds in water. Most applications of COD determine the amount of organic pollutants found in surface water (e.g., lakes, streams, rivers, etc.) or wastewater, making COD a useful measure of water quality. It is expressed in milligrams per liter (mg/L) also referred to as ppm (parts per million), which indicates the mass of oxygen consumed per liter of solution.
chlorate—any salt of chloric acid, and containing the radical and/or monovalent ion $ClO_3^-$.

composition—a composition of matter and/or an aggregate, mixture, reaction product, and/or result of combining two or more substances.

compound—a pure, macroscopically homogeneous substance consisting of atoms or ions of two or more different elements in definite proportions that cannot be separated by physical methods. A compound usually has properties unlike those of its constituent elements.

compress—to decrease the volume of air and/or other gas by the application of pressure.

comprises—includes, but is not limited to, what follows.

comprising—including but not limited to.

concentration—a measure of how much of a given substance is mixed, dissolved, contained, and/or otherwise present in and/or with another substance; and/or a measure of the amount of dissolved substance contained per unit of volume and/or the amount of a specified substance in a unit amount of another substance.

configure—to design, arrange, set up, shape, and/or make suitable and/or fit for a specific purpose, function, use, and/or situation.

configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.

contact—to touch and/or come together.

contain—to have, include, possess, and/or hold within a fixed limit, area, and/or volume.

container—an enclosure adapted to constrain a flow of a fluid.

container—an enclosure adapted to constrain a flow of a fluid.

containing—including but not limited to.

contaminant—any substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

contaminate—to pollute, taint, and/or make impure and/or unsuitable, such as by contact and/or mixture with something unclean, bad, hazardous, etc.

content—that which fills and/or is substantially contained by.

continuously—in a manner uninterrupted in time, sequence, substance, and/or extent.

convert—to transform, adapt, and/or change.

converting—the act of transforming.

corresponding—related, associated, accompanying, similar in purpose and/or position, conforming in every respect, and/or equivalent and/or agreeing in amount, quantity, magnitude, quality, and/or degree.

cover—to overlay, place upon and/or over, and/or immerse.

create—to make, form, produce, generate, bring into being, and/or cause to exist.

cubic—shaped in a manner resembling a cube.

cycle—a set of predetermined activities.

define—to establish the meaning, relationship, outline, form, and/or structure of; and/or to precisely and/or distinctly describe and/or specify.

depth—the extent, measurement, and/or dimension downward, backward, and/or inward.

determine—to find out, obtain, calculate, decide, deduce, ascertain, and/or come to a decision, typically by investigation, reasoning, and/or calculation.

device—a machine, manufacture, and/or collection thereof.

different—changed, distinct, and/or separate.

diffuse—to widely spread and/or scatter.

during—at some time in a time interval.

EDTA—ethylenediaminetetracetic acid.

effective—sufficient to bring about, provoke, elicit, and/or cause.

elemental—of, relating to, or denoting a chemical element.

embodiment—an implementation, manifestation, and/or a concrete representation, such as of a concept.

enclosed—substantially closed in, included in, and/or surrounded on all sides.

enter—to come and/or flow into.

environment—all external conditions that affect an organism or other specified system during its lifetime.

escape—to issue, outflow, discharge, emanate, emit, leak, get free of, and/or break loose from.

estimate—(n) a calculated value approximating an actual value; (v) to calculate and/or determine approximately and/or tentatively.

exemplary—serving as an example, model, instance, and/or illustration.

ferric—of, relating to, and/or containing iron, especially with valence 3 and/or in its plus-three oxidation state, Fe(III) (sometimes designated $Fe^{3+}$) and/or a valence higher than in a corresponding ferrous compound.

ferric chelate—any organic and inorganic polydentate ligand complexed with ferric ion, Fe(III), and/or ferrous ion, Fe(II), including the ferro aminocarboxylates (such as ferric/ferrous MGDA, ferric/ferrous EDTA, ferric/ferrous HEIDA, and/or ferric/ferrous NTA, etc.), ferric/ferrous gluconate, etc.

ferric/ferrous—ferric and/or ferrous.

ferro—iron-containing and/or ferric and/or ferrous.

ferrous—of or containing iron, especially with valence 2 and/or in its plus-two oxidation state, Fe(II) (sometimes designated $Fe^{2+}$) and/or a valence lower than in a corresponding ferric compound.

first—a label for a referenced element in one or more patent claims, but that label does not necessarily imply any type of ordering to how that element (or any other elements of a similar type) is implemented in embodiments of the claimed subject matter.

flow—to stream and/or continuously transfer.

for—with a purpose of.

form—to produce, make, create, generate, compose, establish, construct, build, and/or shape.

from—used to indicate a source, origin, and/or location thereof further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container; and/or a substance in a gaseous state.

gaseous—existing in the state of a gas and/or pertaining to and/or having the characteristics of gas; and/or not solid or liquid.
generate—to create, produce, render, give rise to, and/or bring into existence.
gluconate—any salt or ester of gluconic acid
greater than—larger and/or more than.
having—possessing, characterized by, comvprising, and/or including but not limited to.
HEIDA—hydroxyethyliminodiacetic acid
hydrogen sulfide—a colorless poisonous gas with a smell of rotten eggs, made by the action of acids on sulfides.
including—having, but not limited to, what follows.
increase—to become greater or more in size, quantity, number, degree, value, intensity, and/or power, etc.
initialize—to prepare something for use and/or some future event.
inject—to place into an orbit, trajectory, and/or stream.
into—to a condition, state, or form of
introduce—to insert, inject, and/or put inside and/or into.
ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl–1–, Ca++, S
iron—a silvery-white, lustrous, malleable, ductile, magnetic or magnetizable, metallic element occurring abundantly in combined forms, notably in hematite, limonite, magnetite, and taconite, and used alloyed in a wide range of important structural materials. Atomic number 26; atomic weight 55.845; melting point 1,535° C.; boiling point 2,750° C.; specific gravity 7.874 (at 20° C.); valence 2, 3, 4, 6.
is—to exist in actuality.
layer—a substantially planar, horizontal, and/or continuous thickness, stratum, course, lamina, coating, and/or sheet.
less than—having a measurably smaller magnitude and/or degree as compared to something else.
ligand—an ion, a molecule, or a molecular group that binds to another chemical entity to form a larger complex
maintain—to retain, preserve, sustain, keep in an existing state, and/or continue to obtain.
malodorous—having a bad and/or foul odor.
manmade—a tangible physical item that is synthetic and/or made by humans rather than occurring in nature.
mass-to-mass ratio—the mass of a first substance expressed with respect to the mass of a second substance.
may—is allowed and/or permitted to, in at least some embodiments.
medium—any substance or material, such as one or more solids, liquids, vapors, fluids, water, and/or air, etc.
meter—a device adapted to detect and/or record a measured value.
method—one or more acts that are performed upon subject matter to be transformed to a different state or thing and/or are tied to a particular apparatus, said one or more acts not a fundamental principal and not preempting all uses of a fundamental principal.
MGDA—Methyl Glycine Di-Acetate, methylglycinediacetate, and/or trisodium methylglycinediacetate.
milligram—One one-thousandth of a gram.
mix—to combine and/or blend into one mass, stream, and/or mixture.
molecule—the smallest particle of a substance that retains the chemical and physical properties of the substance and is composed of two or more atoms; and/or a group of like or different atoms held together by chemical forces.
more—a quantifier meaning greater in size, amount, extent, and/or degree.
mV—milliVolts.
natural gas—a flammable gas, consisting largely of methane and other hydrocarbons, occurring naturally underground (often in association with petroleum) and used as fuel.
nitrate—the univalent radical NO3 or a compound containing it, as a salt or an ester of nitric acid.
nitrate/nitrite—nitric acid, nitrous acid, and/or any salt, ester, alcohol, and/or oxidized ion of nitric acid or nitrous acid, having the molecular formula $NO^{3-}$ or $NO^{2-}$, such as calcium nitrate, sodium nitrate, ammonium nitrate, potassium nitrate, sodium nitrite, potassium nitrite, ammonium nitrite, and/or calcium nitrite, etc.
nitrite—the univalent radical NO2 or a compound containing it, such as a salt or an ester of nitrous acid.
nitrous oxide—a colourless nonflammable slightly soluble gas with a sweet smell that is used as an anaesthetic in dentistry and surgery and has the formula $N_2O$.
no—an absence of and/or lacking any.
NTA—nitrilotriacetic acid
occur—to happen, take place, and/or come about.
one—being or amounting to a single unit, individual, and/or entire thing, item, and/or object.
onto—upon, on top of, and/or to a place and/or position on.
open—not closed and/or not substantially obstructed.
operable—practicable and/or fit, ready, and/or configured to be put into its intended use and/or service.
or—a conjunction used to indicate alternatives, typically appearing only before the last item in a group of alternative items.
organic—a compound containing carbon, which is further characterized by the presence in the molecule of two carbon atoms bonded together; or one atom of carbon bonded to at least one atom of hydrogen or halogen; or one atom of carbon bonded to at least one atom of nitrogen by a single or double bond.
oxidation—a chemical reaction in which an atom or ion loses electrons, thus undergoing an increase in valence, e.g., removing an electron from an iron atom having a valence of +2 changes the valence to +3.
oxidation-reduction—a reversible chemical process usually involving the transfer of electrons, in which one reaction is an oxidation and the reverse reaction is a reduction.
oxidation-reduction potential—in aqueous solutions, a measure of the tendency of the solution to either gain or lose electrons when it is subject to change by introduction of a new species.
oxide—any compound of oxygen with another element.
oxidize—to undergo and/or cause to undergo a chemical reaction and/or combination with oxygen; to convert (an element) into an oxide; to form and/or cause to form a layer of metal oxide, as in rusting; to add oxygen and/or any nonmetal; to lose and/or cause to lose hydrogen atoms; and/or to undergo and/or cause to undergo a decrease in the number of electrons, thereby increasing the valence.

oxidizing agent ("oxidant")—a substance, such as a hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

oxygen—a nonmetallic element, which constitutes approximately 21 percent of the earth's atmosphere by volume, which occurs as a diatomic gas, O2, and which is assigned atomic number 8, and has atomic weight 15.9994.

ozone—an allotrope of oxygen, O3. Ozone is a relatively reactive oxidizing agent that can be used to purify water.

per—for each and/or by means of.

perborate—any of certain salts derived, or apparently derived, from perboric acid and containing the radical and/or ion $BO_3$.

perchlorate—any salt or ester of perchloric acid and/or containing the radical and/or ion $ClO_4^-$.

permanganate—any of the salts of permanganic acid, all of which are strong oxidizing agents.

peroxide—a compound containing a bivalent —OO— group in the molecule.

persulfate—a sulphate of the peroxide of any base.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

predetermine—to determine, decide, and/or establish in advance.

prevent—to hinder, avert, and/or keep from occurring.

prior—before and/or preceding in time or order.

probability—a quantitative representation of a likelihood of an occurrence.

product—something produced by human or mechanical effort or by a natural process.

project—to calculate, estimate, or predict.

provide—to furnish, supply, give, convey, send, and/or make available.

pure—having a substantially homogeneous and/or uniform composition, not mixed, and/or substantially free of foreign substances.

quantity—a specified amount and/or measure.

range—a measure of an extent of a set of values and/or an amount and/or extent of variation.

ratio—a relationship between two quantities expressed as a quotient of one divided by the other.

re-activate—to make active again and/or to restore the ability to function and/or the effectiveness of.

react—to cause (a substance or substances) to undergo a reaction.

reactants—substances that react in a chemical reaction.

reaction—a change and/or transformation in which a substance decomposes, combines with other substances, and/or interchanges constituents with other substances.

reaction product—something produced by a chemical reaction.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

retain—to keep, hold, and/or restrain.

said—when used in a system or device claim, an article indicating a subsequent claim term that has been previously introduced.

salt—a chemical compound formed by replacing all or part of the hydrogen ions of an acid with metal ions and/or electropositive radicals.

saturated—full and/or unable to hold and/or contain more.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice and/or selection from alternatives.

separately—as a separate entity or entities; not together.

set—a related plurality of predetermined elements; and/or one or more distinct items and/or entities having a specific common property or properties.

simultaneously—at substantially the same time.

sodium chlorite—an explosive, white, mildly hygroscopic, water-soluble powder, having the formula $NaClO_2$, that decomposes at 175° C. and is used as an analytical reagent and oxidizing agent.

sodium percarbonate—a colorless, crystalline, hygroscopic, and water-soluble solid adduct of sodium carbonate and hydrogen peroxide (a perhydrate), with formula $2Na_2CO_3.3H_2O_2$.

solution—a substantially homogeneous molecular mixture and/or combination of two or more substances.

sour gas—natural gas that contains greater than approximately 5.7 milligrams of H2S per cubic meter (ppm), which is roughly equivalent to 4 parts per million by volume under standard temperature and pressure.

source—an compound comprising and/or capable of generating.

species—a class of individuals and/or objects grouped by virtue of their common attributes and assigned a common name; a division subordinate to a genus.

spent—used up, consumed, exhausted, and/or depleted of effectiveness.

spray—(v) to disperse (a liquid, for example) in a mass and/or jet of droplets, particles, and/or small pieces; (n) water and/or other liquid broken up into minute droplets and blown, ejected into, and/or falling through the air.

state—a qualitative and/or quantitative description of condition.

stream—a steady current of a fluid.

substantially—to a considerable, large, and/or great, but not necessarily whole and/or entire, extent and/or degree.

sufficient—a degree and/or amount necessary to achieve a predetermined result.

sulfide—any compound of sulfur and another element, the compound containing the sulfur 2-ion or sulfur with an oxidation state of −2.

sulfonate—an ester or salt of sulfonic acid.

sulfur—A pale yellow nonmetallic element, occurring widely in nature in several free and combined allotropic forms, which is used in black gunpowder, rubber vulcanization, the manufacture of insecticides and pharmaceuticals, and in the preparation of sulfur compounds such as hydrogen sulfide and sulfuric acid, and which has: atomic number 16; atomic weight 32.066; melting point (rhombic) 112.8° C., (monoclinic) 119.0° C.; boiling point 444.6° C.; specific gravity (rhombic) 2.07, (monoclinic) 1.957; and valence 2, 4, 6.

suppress—to inhibit, restrain, and/or curtail.

surface—the exterior and/or outer face and/or boundary of a body, object and/or thing.

sweet gas—natural gas that contains less than approximately 5.7 milligrams of H2S per cubic meter (ppm), which is roughly equivalent to 4 parts per million by volume under standard temperature and pressure.

system—a collection of mechanisms, devices, machines, articles of manufacture, processes, data, and/or instructions, the collection designed to perform one or more specific functions.

that—used as the subject or object of a relative clause.

through—across, among, between, and/or in one side and out the opposite and/or another side of.

time—a measurement of a point in a nonspatial continuum in which events occur in apparently irreversible succession from the past through the present to the future.

to—a preposition adapted for use for expressing purpose.

top—an uppermost point and/or above relative to a predetermined orientation of an object.

transform—to change in measurable: form, appearance, nature, and/or character.

transmit—to send as a signal, provide, furnish, and/or supply.

treatment—an act, manner, or method of handling and/or dealing with someone and/or something.

use—to put into service.

vessel—an object used as a container, especially for a fluid.

via—by way of and/or utilizing.

wastewater—liquid and/or waterborne wastes generated by residential, commercial, and/or industrial operations, and potentially including sewage, excrement, dissolved solids, suspended solids, surface water, storm water, and/or groundwater.

water—a transparent, odorless, tasteless liquid containing approximately 11.188 percent hydrogen and approximately 88.812 percent oxygen, by weight, characterized by the chemical formula H2O, and, at standard pressure (approximately 14.7 psia), freezing at approximately 32° F. or OC and boiling at approximately 212° F. or 100 C.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

withdraw—to remove, take, or take back, out, away, or aside.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;
any described characteristic, function, activity, substance, component, and/or structural element, or any combination thereof, can be specifically included, duplicated, excluded, combined, reordered, reconfigured, integrated, and/or segregated;
any described interrelationship, sequence, and/or dependence between any described characteristics, functions, activities, substances, components, and/or structural elements can be omitted, changed, varied, and/or reordered;
any described activity can be performed manually, semi-automatically, and/or automatically;
any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method comprising:
    continuously withdrawing, from an open container, contaminated water having a chemical oxygen demand of between approximately 2,000 mg/l and approximately 10,000 mg/l;
    causing reactions, between sulfides in the contaminated water with a ferric chelate and between sulfides in the contaminated water with an oxidizing agent, to form substantially sulfide-free water, the substantially sulfide-free water comprising the ferric chelate and the oxidizing agent;
    spraying the substantially sulfide-free water onto a top surface layer of the contaminated water in the container;
    substantially suppressing escape of gaseous hydrogen sulfide from the top surface layer.

2. The method of claim 1, further comprising:
    applying an aqueous solution comprising the ferric chelate to the contaminated water.

3. The method of claim 1, further comprising:
    applying an aqueous solution comprising the oxidizing agent to the contaminated water.

4. The method of claim 1, further comprising:
    applying an aqueous solution comprising the ferric chelate to the contaminated water; and separately,
    applying an aqueous solution comprising the oxidizing agent to the contaminated water.

5. The method of claim 1, further comprising:
    applying an aqueous solution comprising the ferric chelate to the contaminated water separately; and substantially simultaneously,
    applying an aqueous solution comprising the oxidizing agent to the contaminated water.

6. The method of claim 1, further comprising:
applying an aqueous solution comprising the ferric chelate to the contaminated water separately; and sequentially,
applying an aqueous solution comprising the oxidizing agent to the contaminated water.

7. The method of claim 1, further comprising:
mixing an aqueous solution comprising the ferric chelate with the contaminated water.

8. The method of claim 1, further comprising:
mixing an aqueous solution comprising the oxidizing agent with the contaminated water.

9. The method of claim 1, further comprising:
via the reactions, converting the sulfides to elemental sulfur.

10. The method of claim 1, further comprising:
retaining the contaminated water, ferric chelate, and oxidizing agent within one or more enclosed treatment vessels for sufficient time for the ferric chelate and oxidizing agent to reduce the concentration of the sulfides in the contaminated water to less than 0.1 mg/l.

11. The method of claim 1, further comprising:
covering the top surface layer of the contaminated water in the container with the substantially sulfide-free water.

12. The method of claim 1, further comprising:
substantially preventing mixing of the contaminated water within the top surface layer.

13. The method of claim 1, wherein:
a sufficient quantity of the substantially sulfide-free water is applied onto the top surface layer to increase a depth of the substantially sulfide-free water in the container by approximately 0.5 centimeters to approximately 1.5 centimeters per hour.

14. The method of claim 1, wherein:
the ratio of sulfides in the substantially sulfide-free water contains to sulfides in the contaminated water is less than 1%.

15. The method of claim 1, wherein:
the contaminated water has a pH between approximately 6.8 and 7.2 at the time of the reactions.

16. The method of claim 1, wherein:
the contaminated water has a pH between approximately 6.3 and 8.5 at the time of the reactions.

17. The method of claim 1, wherein:
the substantially sulfide-free water contains less than 0.1 mg/l of sulfide.

18. The method of claim 1, wherein:
the concentration of the ferric chelate in the substantially sulfide-free water is approximately 25 micrograms to approximately 35 micrograms per 1.0 mg of hydrogen sulfide in the substantially sulfide-free water.

19. The method of claim 1, wherein:
the concentration of the ferric chelate in the substantially sulfide-free water is less than 50 micrograms per 1.0 mg of hydrogen sulfide in the substantially sulfide-free water.

20. The method of claim 1, wherein:
the concentration of the ferric chelate in the substantially sulfide-free water is greater than 5 ppm.

21. The method of claim 1, wherein:
the concentration of the oxidizing agent in the substantially sulfide-free water is greater than 10 ppm.

22. The method of claim 1, further comprising:
the concentration of the oxidizing agent in the substantially sulfide-free water was approximately 1.5 mg to approximately 2.0 mg per 1.0 mg of hydrogen sulfide in the substantially sulfide-free water.

23. The method of claim 1, further comprising:
the concentration of the oxidizing agent in the substantially sulfide-free water was less than 1.0 mg per 1.0 mg of hydrogen sulfide in the substantially sulfide-free water.

* * * * *